US009010419B2

(12) United States Patent
Wagg et al.

(10) Patent No.: US 9,010,419 B2
(45) Date of Patent: Apr. 21, 2015

(54) SUBTERRANEAN SYSTEM AND METHOD FOR TREATING AND PRODUCING OIL

(75) Inventors: Brian T. Wagg, Edmonton (CA); Cameron M. Matthews, Edmonton (CA); Damien Clapa, Edmonton (CA); Christopher Michael John Timms, Edmonton (CA)

(73) Assignee: C-Fer Technologies (1999) Inc. (CA)

( * ) Notice: Subject to any disclaimer, the term of this patent is extended or adjusted under 35 U.S.C. 154(b) by 1154 days.

(21) Appl. No.: 12/441,058

(22) PCT Filed: Sep. 14, 2007

(86) PCT No.: PCT/CA2007/001628
§ 371 (c)(1),
(2), (4) Date: Oct. 29, 2009

(87) PCT Pub. No.: WO2008/031223
PCT Pub. Date: Mar. 20, 2008

(65) Prior Publication Data
US 2010/0193193 A1 Aug. 5, 2010

(51) Int. Cl.
*E21B 43/38* (2006.01)
*B65G 5/00* (2006.01)

(52) U.S. Cl.
CPC .. *E21B 43/38* (2013.01); *B65G 5/00* (2013.01)

(58) Field of Classification Search
CPC ..... E21B 43/2406; E21B 43/16; E21B 43/30; E21B 43/34; E21B 43/385; E21B 41/0051; B65G 5/00
USPC .......................... 166/313, 369, 52, 242.3, 245
See application file for complete search history.

(56) References Cited

U.S. PATENT DOCUMENTS

| 3,386,508 A | 6/1968 | Bielstein et al. |
| 3,739,851 A | 6/1973 | Beard |

(Continued)

FOREIGN PATENT DOCUMENTS

| CA | 1173353 | 8/1984 |
| CA | 1173356 | 8/1984 |

(Continued)

OTHER PUBLICATIONS

Lentz, R.W., "The disposal of sand produced . . . " Environmental Issues and Waste Management in Energy and Minerals Production, Singhal et al. 677-684, 1992.

*Primary Examiner* — Elizabeth Gitlin
(74) *Attorney, Agent, or Firm* — Terrence N. Kuharchuk; Rodman & Rodman

(57) ABSTRACT

A method and system for use in association with a subterranean reservoir containing reservoir material, for separating the reservoir material into components and for producing one or more of the reservoir material components at a surface production location. The reservoir material components include one or more liquid components and a solid component. The system includes a subterranean cavern located below the reservoir. A drain extends between the reservoir and the cavern for draining the reservoir material from the reservoir into the cavern so that the reservoir material may be collected and separated into the reservoir material components in the cavern. A production well extends between the cavern and the surface production location for producing one or more of the reservoir material components at the surface production location. Preferably, one or more of the liquid components are produced at the surface production location while retaining the solid component in the cavern.

29 Claims, 12 Drawing Sheets

(56) References Cited

U.S. PATENT DOCUMENTS

| | | | |
|---|---|---|---|
| 3,922,863 A | 12/1975 | Shock et al. | |
| 4,016,930 A * | 4/1977 | Arnold | 166/266 |
| 4,353,214 A | 10/1982 | Gardner | |
| 4,365,978 A | 12/1982 | Scott | |
| 4,435,290 A | 3/1984 | Lindorfer et al. | |
| 4,456,065 A | 6/1984 | Heim et al. | |
| 4,488,834 A | 12/1984 | Hooper et al. | |
| 4,595,239 A | 6/1986 | Ayler et al. | |
| 4,691,524 A | 9/1987 | Holscher | |
| 4,906,135 A | 3/1990 | Brassow et al. | |
| 5,310,282 A | 5/1994 | Voskamp | |
| 5,394,943 A | 3/1995 | Harrington | |
| 5,431,482 A | 7/1995 | Russo | |
| 5,589,603 A | 12/1996 | Alexander et al. | |
| 5,648,603 A | 7/1997 | Hanson | |
| 5,722,792 A | 3/1998 | Morisseau | |
| 5,734,988 A | 3/1998 | Alexander et al. | |
| 6,182,751 B1 | 2/2001 | Koshkin et al. | |
| 6,210,073 B1 | 4/2001 | Buehlman et al. | |
| 6,820,696 B2 * | 11/2004 | Bergman et al. | 166/369 |
| 2003/0116316 A1 | 6/2003 | Bouma et al. | |
| 2004/0246140 A1 * | 12/2004 | Barbot et al. | 340/854.3 |
| 2005/0167119 A1 | 8/2005 | Diamond et al. | |
| 2005/0189114 A1 * | 9/2005 | Zupanick | 166/313 |

FOREIGN PATENT DOCUMENTS

| | | |
|---|---|---|
| CA | 2125355 | 4/1998 |
| DE | WO0036270 | 6/2000 |

* cited by examiner

SUBTERRANEAN SYSTEM AND METHOD FOR TREATING AND PRODUCING OIL

FIELD OF INVENTION

The present invention relates to a method and a system for use in association with a subterranean reservoir containing reservoir material and for separating and producing to the surface one or more of the components comprising the reservoir material. Further, the present invention relates to a method and a system for sub-surface processing of heavy oil that promotes sand production from the subterranean reservoir with the heavy oil and then sequesters the produced sand in a solution mined salt cavern situated below the reservoir.

BACKGROUND OF INVENTION

Heavy oil producers in Western Canada have generally accepted the notion that non-thermal heavy oil production is not economically feasible without allowing, and in some cases promoting, sand production. For instance, in the primary production of heavy oil, cold heavy oil production with sand (known as "CHOPS") is currently one of the key production techniques utilized in the development of the heavy oil reserves or subterranean reservoirs. However, this operating strategy and method of production has led to operators producing as much as 500,000 m$^3$ of sand per year. Handling and disposal cost for this by-product of oil production normally exceeds \$100/m$^3$. In addition, workovers on producing wells due to sand accumulation in the pumps and increased wear due to the presence of sand in the produced fluids routinely account for over 25% of heavy oil operating costs.

While the elimination of sand production may significantly reduce heavy oil operating costs, past experience has shown that the use of sand retention devices in primary production heavy oil wells may severely impair oil production rates. Therefore it appears that the sand must be produced.

Produced sand is currently handled as a waste product requiring special handling facilities, cleaning plants and some method of ultimate disposal. Many operators currently dispose of the produced sand in salt caverns. Some of these caverns were initially used for liquid and gaseous hydrocarbon storage while more recently some operators and service companies have constructed caverns expressly for produced sand disposal. The current production techniques, however, require the sand to be pumped to surface, trucked to a central facility, stockpiled and finally injected into the salt cavern. This process tends to be relatively expensive and increases the risk of environmental contamination due to increased transportation of sand over potentially long distances and prolonged surface storage.

The present methods of producing heavy oil rely on the use of individual well storage tanks for collecting produced fluids from either a single well or small groups of wells. These tanks are open to the atmosphere. While significant quantities of solution gas, principally methane, are produced, this gas is generally allowed to vent to atmosphere. For instance, it has been found that for each cubic meter of heavy oil produced there are typically 20 cubic meters of solution gas (primarily methane) vented to the atmosphere. Further, it has been suggested that the volume of gas vented from heavy oil wells in Western Canada may be in the order of 700 m$^3$/day per well. Reducing this volume of vented "greenhouse gas" has become one of the more prominent mandates of the oil industry and the Province of Alberta, Canada as a whole.

Using flowlines or pipelines to collect heavy oil produced to the surface with sand, or sand-laden heavy oil, has been found to be both impractical and economically unattractive for various reasons, including concerns with the plugging of the flowlines by the sand. Thus, in most cases, heavy oil, sand and water are trucked to a central battery or facility, further contributing to greenhouse gas emissions and increasing road hazards to the general public. In addition, heavy oil wells often become unprofitable when the volume of water produced increases even when there is still significant daily oil production, due at least in part to the high cost of transporting the water from the well storage tanks to a disposal facility.

Thus, there remains a need for an improved system and method for the primary production of subterranean reservoirs, particularly those containing an oil component such as heavy oil. Preferably, the improved system and method address the production of a solid component, particularly sand, from the reservoir in a manner which may reduce the environmental impact and operating costs as compared with current primary production systems and methods.

SUMMARY OF INVENTION

The present invention relates to a method and a system for use in association with a subterranean reservoir containing reservoir material and for separating and producing to the surface one or more of the components comprising the reservoir material.

Preferably, the method and the system are provided for sub-surface processing of an oil component of the reservoir material, such as heavy oil, that promotes the production of a solid component of the reservoir material, such as sand, from the subterranean reservoir with the oil component and then separates and sequesters the solid component in a cavern situated below the reservoir.

More preferably, the system and the method provide downhole or sub-surface separation and storage of produced sand, while taking advantage of the beneficial production effects of the CHOPS reservoir process. In particular, one or more, and preferably each of, liquid components of the reservoir material, including an oil component and a water component, a gaseous component of the reservoir material and a solid component of the reservoir material flow together from the producing subterranean reservoir through a drain to a subterranean cavern. Preferably, the subterranean cavern is located some distance below the producing subterranean reservoir. Preferably, the drain is comprised of a plurality of drainage wells. Further, a production well extends from the cavern to a surface production location to withdraw or produce one or more of the liquid components from the cavern, while retaining the solid component in the cavern.

In one embodiment of the system of the invention, the system is for use in association with a subterranean reservoir containing reservoir material, for separating the reservoir material into a plurality of reservoir material components and for producing one or more of the reservoir material components at a surface production location, the system comprising:

(a) a subterranean cavern located below the reservoir;
(b) a drain extending between the reservoir and the cavern for draining the reservoir material from the reservoir into the cavern so that the reservoir material may be collected in the cavern and separated into the reservoir material components in the cavern; and
(c) a production well extending between the cavern and the surface production location for producing one or more of the reservoir material components at the surface production location.

In one embodiment of the method of the invention, the method is for use in association with a subterranean reservoir containing reservoir material, the method comprising:

(a) providing a subterranean cavern located below the reservoir;
(b) providing a drain extending between the reservoir and the cavern;
(c) providing a production well extending between the cavern and a surface production location;
(d) draining the reservoir material through the drain from the reservoir into the cavern so that the reservoir material may be collected in the cavern;
(e) separating the reservoir material in the cavern into a plurality of reservoir material components; and
(f) producing one or more of the reservoir material components at the surface production location through the production well.

The method of the invention may be performed by any suitable system capable of and compatible with performing or carrying out each of the steps of the present method. However, preferably, the method of the invention is performed utilizing the system of the present invention.

The subterranean reservoir may be any sub-surface or underground formation or reservoir containing reservoir material desired to be produced to the surface. The reservoir material is comprised of a plurality of reservoir material components. In a preferred embodiment, the subterranean reservoir is a hydrocarbon producing formation, wherein the reservoir material components are comprised of one or more liquid components and a solid component. More preferably, the liquid components are comprised of at least one, and preferably both, of an oil component, such as heavy oil, and a water component. In this instance, the solid component is typically comprised of sand, rock fragments or particles, solids precipitated from the water component, such as scale, and/or solids precipitated from the oil component, such as paraffin or asphaltenes. However, as utilized herein, a reference to "sand" is intended as a general reference to the solid component. Finally, the reservoir material components may also be comprised of an amount of a gaseous component, such as a hydrocarbon gas, typically in solution or entrained in the liquid components.

The system and the method are provided for separating the reservoir material into a plurality of the reservoir material components and for producing one or more of the reservoir material components at the surface production location. However, as described below, a portion of the gaseous component may also be produced at a surface drain location. Typically, the surface production location is comprised of a production wellhead. Further, although the components are intended to be separated, the various components tend to continue to be intermingled or combined to some degree or amount one with the other. Complete or full separation of the reservoir material components may not be achieved or required.

In other words, following separation, the reference to each separated component refers to the major constituent of that component. For instance, the liquid components are comprised primarily of liquids or a major portion of the liquid components is liquids. More preferably, the liquid components are comprised substantially of liquids. However, the liquid components may include a relatively small or minor amount of the solid component therein, referred to as a residual solid component. Further, the liquids component may include a relatively small or minor amount of the gaseous component.

Similarly, the water component is comprised primarily of water or a major portion of the water component is water. More preferably, the water component is comprised substantially of water. However, the water component may include a relatively small or minor amount of the oil component, the solid component and/or the gaseous component. The oil component is comprised primarily of oil or a major portion of the oil component is oil. More preferably, the oil component is comprised substantially of oil. However, the oil component may include a relatively small or minor amount of the water component, the solid component and/or the gaseous component.

Finally, the solid component is comprised primarily of solids or a major portion of the solid component is solids. More preferably, the solid component is comprised substantially of solids. However, the solid component may include a relatively small or minor amount of one or more of the liquid components and/or the gaseous component.

As indicated, the system is comprised of a subterranean cavern located below the reservoir. Thus, the method is comprised of providing the subterranean cavern. The cavern may be comprised of any underground or subsurface space, void or cavern located or positioned below the subterranean reservoir. However, in some embodiments, the subterranean cavern is comprised of a salt cavern. The cavern, such as the salt cavern, may be provided in any manner and may be a pre-existing subterranean cavern. However, in some embodiments, providing the cavern is comprised of forming the cavern by solution mining.

In addition, the system is comprised of a drain extending between the reservoir and the cavern for draining the reservoir material from the reservoir into the cavern. The reservoir material is collected in the cavern and separated into the reservoir material components. Accordingly, the method includes providing the drain, draining the reservoir material through the drain from the reservoir into the cavern for collection and separating the reservoir material in the cavern into the plurality of reservoir material components. The drain may be comprised of any structure or mechanism permitting, facilitating or actuating the reservoir material to flow or drain from the reservoir to the cavern. Further, the reservoir material may flow from the reservoir to the cavity by any mechanism. However, preferably, gravity drainage is utilized. In other words, the reservoir material simply flows by gravity to the cavern.

In some embodiments, the drain is comprised of at least one drainage well and preferably a plurality of drainage wells, wherein each of the drainage wells extends between the reservoir and the cavern. Preferably, each of the drainage wells extends between a surface drain location and the cavern such that each drainage well passes through the reservoir as it extends between the surface drain location and the cavern. Further, the drain has a drain outlet for connecting the drain with the cavern. Where the drain is comprised of a plurality of drainage wells, the drain outlet is comprised of a plurality of drainage well outlets.

Thus, in some embodiments of the invention, the drain is comprised of a plurality of drainage wells, wherein each drainage well extends from a surface drain location, through the reservoir, to a drainage well outlet within or in close proximity to the cavern such that the reservoir material may pass or flow into the cavern. The surface drain location may be comprised of a drainage wellhead. With respect to the preferred method, providing the drain is comprised of providing a plurality of drainage wells, wherein each of the drainage wells extends between a surface drain location and the cavern.

As indicated, once collected within the cavern, the reservoir material separates into the reservoir material components. As further indicated, the reservoir material components are typically comprised of one or more liquid components, a solid component and a gaseous component. Preferably, the liquid components are comprised of an oil component and are further comprised of a water component. Thus, the reservoir material components preferably separate into, and the cavern preferably contains, a solid component layer, a water component layer and an oil component layer. The oil component layer provides the top layer within the cavern, while the solid component provides the bottom layer in the cavern. The water component layer is positioned between the oil component layer and the solid component layer.

The gaseous component may provide a gaseous component layer in the cavern in some embodiments. However, preferably, the gaseous component does not provide a gaseous component layer in the cavern so that the oil component layer may extend up into the production well. Thus, the lifting power requirements of any pumping or artificial lift system provided in the production well may be minimized or decreased.

In addition, the system is further preferably comprised of a production well extending between the cavern and the surface production location for producing one or more of the reservoir material components at the surface production location. The surface production location may be comprised of a production wellhead. The production wellhead is typically located at or associated with a surface pad. As well, the production well preferably has a production well inlet for connecting the production well with the cavern, in a manner such that the one or more of the reservoir material components may be communicated from the cavern to the surface. Thus, the production well preferably extends from the production well inlet, which is located at, adjacent or in close proximity to a lowermost end of the production well, to the surface production location.

In some embodiments, the surface production location of the production well and the surface drain location of one or more drainage wells may coincide, such as on a single surface pad. In other embodiments, the surface production location for the production well of one cavern may be utilized as the surface drain location for one or more drainage wells of an adjacent cavern.

The production well is configured to produce one or more of the liquid components at the surface production location while retaining the solid component in the cavern. Thus, the production well may be configured to produce the oil component at the surface production location. The production well may be further configured to produce the water component at the surface production location. In some embodiments, the production well is configured to produce separately the oil component and the water component at the surface production location. In other embodiments, the production wells is configured to produce the oil component and the water component together or commingled at the surface production location.

In the method of the invention, the method comprises providing the production well extending between the cavern and the surface production location and producing one or more of the reservoir material components at the surface production location through the production well. Producing one or more of the reservoir material components is preferably comprised of producing one or more of the liquid components at the surface production location while retaining the solid component in the cavern. Producing one or more of the liquid components may be comprised of producing the oil component at the surface production location. Producing one or more of the liquid components may be further comprised of producing the water component at the surface production location. In some embodiments, producing one or more of the liquid components may be comprised of producing the oil component and the water component together or commingled. However, in some other embodiments, producing one or more of the liquid components may be comprised of producing the oil component and the water component separately.

In some embodiments, the reservoir material is drained into the cavern so that the reservoir material enters the cavern within the water component layer. Thus, the drain is preferably located or positioned within, or in close proximity to, the water component layer of the cavern. Where the drain is comprised of drainage wells, each drainage well outlet is located or positioned within, or in close proximity to, the water component layer. Further, in some embodiments, the production well inlet is located above the drain outlet, or the drainage well outlets. However, the reservoir material may enter the cavern in an alternate location. For instance, the drain or drainage wells may enter the cavern above the water component layer. Thus, the drain outlet or drainage well outlets may be located above the production well inlet.

Finally, the system of the invention may be comprised of several further components. For instance, the system may be further comprised of a solids removal system associated with the production well for removing the residual solid component from the liquid components before they are produced at the surface production location. Preferably, the solids removal system is positioned or located within the production well at or in close proximity to the production well inlet. More preferably, the solids removal system is positioned at the lowermost end of the production well, below the production well inlet. However, it may alternately be positioned at any compatible location along the length of the production well between the surface production location and the production well inlet. Any system or mechanism suitable for, or capable of, removing the residual solids component from the liquids component may be utilized. Thus, the method may also include removing the residual solid component from the liquid components before they are produced at the surface production location. In some embodiments, the removed residual solids are re-circulated or returned to the cavern, preferably within the water component layer such that the solids may settle to the solid component layer.

Further, where each of the drainage wells extends between the surface drain location and the cavern, the system may be further comprised of a gas collection system for collecting hydrocarbon gas contained within at least one, and preferably each of, the drainage wells and the production well. Preferably, the gas collection system is associated with each of the drainage wells and the production well to permit the hydrocarbon gas contained therein to be collected.

In some embodiments, the gas collection system collects the hydrocarbon gas in each of the wells at a single collection location, preferably at the surface. The single collection location is preferably associated with the production wellhead or the surface production location. However, in other embodiments, the gas collection system collects the hydrocarbon gas in each of the wells separately at a plurality of collection locations, all of which are preferably at the surface. For instance, each of the collection locations may be associated with the production wellhead or one of the drainage wellheads or surface drain locations. Any system or mechanism suitable for, or capable of, collecting the hydrocarbon gas may be utilized. Further, the method may also include collecting the hydrocarbon gas using the gas collection system.

In addition, the system may be further comprised of a pressure regulating system for regulating the pressure in at least one, and preferably each, of the drainage wells and the production well. Any system or mechanism suitable for, or capable of, regulating, controlling or managing the pressure in the required or desired drainage wells and production well may be utilized. In some embodiments, the pressure regulating system is associated with the gas collection system. For example, the pressure in the drainage and production wells may be regulated by controlling or monitoring the amount of gas collected or removed from the drainage and production wells by the gas collection system.

Further, each of the drainage wells has a reservoir interface pressure adjacent to the reservoir. In some embodiments, the method may further comprise managing the reservoir interface pressure in the drainage wells in order to facilitate draining of the reservoir material into the cavern. Thus, the pressure regulating system may further manage the reservoir interface pressure.

As well, the system may further comprise a flushing system for flushing the drainage wells. Flushing of the drainage wells may be desired or required to clear debris or solids, such as sand, accumulated within the drainage wells. Further, the debris or solids flushed from the drainage wells is preferably flushed into the cavern. Any system or mechanism suitable for, or capable of flushing the required or desired drainage wells may be utilized. In some embodiments, the flushing system is associated with the gas collection system. For example, the structure or mechanisms of the gas collection system used to collect or remove the hydrocarbon gas from the drainage and production wells may also be used to inject or flush fluids through the drainage and/or production wells to clear any obstructions.

In addition, in some embodiments, the flushing system may be comprised of a re-circulation mechanism or system for re-circulating at least a portion of the water component from the production well into the drainage wells to be flushed.

Thus, the method may further comprise flushing the drainage wells. In some embodiments, wherein the water component is produced at the surface production location, flushing the drainage wells may be comprised of passing the produced water component through the drainage wells.

As well, in some embodiments, the method may further comprise transferring the water component, or at least a portion thereof, from the cavern to a subterranean disposal zone. The water component may be transferred to the subterranean disposal zone either directly from the cavern or indirectly from the cavern via the production well or other intermediate structure or mechanism. The subterranean disposal zone may be located either above or below the cavern.

In some further embodiments, the method may further comprise transferring the water component, or at least a portion thereof, from the cavern to the reservoir. The water component may be transferred to the reservoir (or an adjacent producing reservoir) either directly from the cavern or indirectly from the cavern via the production well or other intermediate structure or mechanism. Transferring the water component to the reservoir may comprise a part or portion of a waterflood or enhanced oil recovery operation.

Finally, in some embodiments, the method may further comprise monitoring the drainage wells during draining of the reservoir material. Any monitoring equipment may be used which is suitable for and compatible with monitoring the drainage wells (40), and the monitoring may be conducted or performed in any manner and by any method capable of providing the desired information regarding the drainage wells (40).

Monitoring the drainage wells may be comprised of measuring a flow of the reservoir material from each of the drainage wells into the cavern. Alternately or in addition, monitoring the drainage wells may be comprised of measuring a temperature gradient and a pressure gradient along each of the drainage wells. In either case, any measuring equipment may be used which is suitable for and compatible with providing the desired measurement or information.

SUMMARY OF DRAWINGS

Embodiments of the invention will now be described with reference to the accompanying drawings, in which.

DETAILED DESCRIPTION

Figure 1:
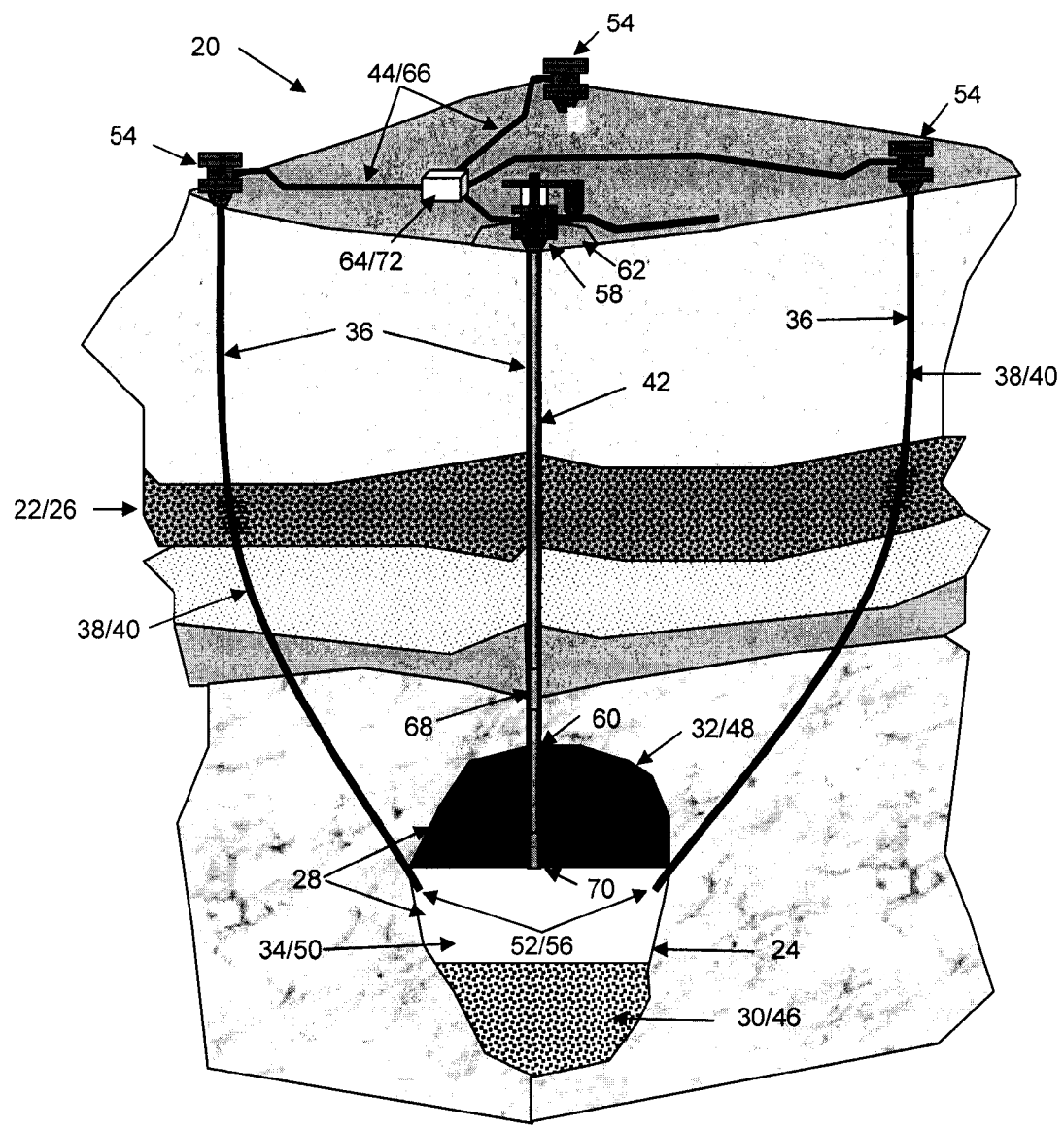
FIG. 1 is a schematic drawing of a preferred embodiment of a system of the invention for use in association with a subterranean reservoir, the system comprising a plurality of drainage wells and a production well.

The present invention relates to a system (20) and a method for sub-surface processing of oil, preferably heavy oil, that promotes sand production from a heavy oil producing formation or a subterranean reservoir (22) and sequesters the produced sand in a subterranean cavern (24), preferably a solution mined salt cavern, situated below the heavy oil reservoir (22).

The subterranean reservoir (22) is an underground formation or reservoir containing reservoir material (26) desired to be produced to the surface. The reservoir material is comprised of a plurality of reservoir material components. In a preferred embodiment, the subterranean reservoir is a hydrocarbon producing formation, wherein the reservoir material components are comprised of one or more liquid components (28) and a solid component (30), preferably sand. The liquid components are preferably comprised of an oil component (32), preferably heavy oil, and a water component (34). The reservoir material components may also be comprised of an amount of a gaseous component (36), such as a hydrocarbon gas.

Preferably, this invention takes advantage of the enhanced oil production typically associated with sand production but may avoid many of the cost and environmental concerns associated with producing, handling and disposing of the produced solid component or sand on surface. Further, the invention may achieve higher production rates and increased heavy oil recovery while reducing capital and operating costs.

Further, the invention particularly relates to a method and system for producing oil, preferably heavy oil. The invention is preferably used for primary heavy oil recovery. In a broad aspect, the invention comprises the subterranean cavern (24) some distance away from and preferably below the subterranean reservoir (22) that functions as a subsurface treatment vessel to separate the sand and preferably also the water from the produced oil.

Referring to FIG. 1, the reservoir material flows from the producing subterranean reservoir (22) through a drain (38) into the cavern (24). The drain (38) may be comprised of at least one, and preferably a plurality of, gravity drainage holes or drainage wells (40) into the cavern (24) which is located a spaced distance below the producing oil reservoir (22). As indicated, preferably a plurality of drainage wells (40) drain into a single cavern (24). In addition, at least one production well (42) is provided to withdraw the liquids component (28), particularly heavy oil and water, from the cavern (24) and to conduct the produced liquids component to the surface. In the preferred embodiment, only a single production well (42) is provided. Upon withdrawal of either or both of the oil component (32) and the water component (34) from the cavern (24), the produced solid component (30) or sand remains downhole within the cavern (24). Thus, the produced sand is stored in the cavern (24), rather than being conveyed to the surface.

FIG. 1 shows a schematic of one possible configuration of the system (20) of the present invention. As shown in FIG. 1, in one embodiment of the system (20), the system (20) is comprised of the cavern (24), a plurality of the drainage wells (40) and the production well (42). In addition, the system (20) may be further comprised of a gas collection system (44).

The subterranean cavern (24) may be comprised of any suitable sub-surface void, space or cavern, but is preferably comprised of a salt cavern. The cavern (24) may be pre-existing or may be created by any suitable method, including by solution mining. For instance, the cavern (24) may be created by solution mining in a salt formation. Alternatively, the cavern (24) may be created in other soluble formations using appropriate solvents, such as acid in a carbonate formation. As well, the cavern (24) may be created by drilling, reaming and/or hydraulic jetting, particularly in non-soluble formations.

As discussed above, the cavern (24) is preferably located below or beneath the heavy oil reservoir (22) such that the produced reservoir material (26) may be conveyed or fed primarily by gravity drainage from the reservoir (22) to the cavern (24) through the drainage wells (40). However, where necessary, continuous or intermittent fluid injection into one or more of the drainage wells (40) or an intermittent gas purge system in one or more of the drainage wells (40) may be used to enhance or facilitate the feeding of the reservoir material (26) into the cavern (24) via the drainage wells (40).

Further, the cavern (24) is preferably sized, configured or dimensioned to provide a sufficient residence time for the solid component or sand and the water component to separate from the oil component, to a desired degree or amount, under the natural heating of the surrounding formation. However, if desired or required, chemical separation systems and/or chemical treatment may also be used to enhance the separation of the sand and/or water from the oil.

More particularly, the cavern (24) is adapted, sized, configured or dimensioned to provide a residence time in the cavern (24) of the reservoir material (26) produced from the drainage wells (40) which is sufficient to allow the reservoir material to separate into the plurality of reservoir material components, and more particularly, to allow a desired amount, portion or percentage of the produced solid component (30) to separate from the produced liquids component (28). Preferably, the residence time is sufficient to permit a major portion, or a majority, of the produced solid component (30) to separate from the produced liquids component (28). More preferably, the residence time is sufficient to permit substantially all of the produced solid component (30) to separate from the produced liquids component (28).

However, it is understood and anticipated that some small or minor amount of fine material or solids, such as produced sand, will still be contained in or carried with the liquids component and vice versa. However, it is believed that the anticipated relatively low concentration of the solids in the separated liquids component (28) will tend to have a minimal impact on both the pump operation in the production well (42), as described below, and any subsequent transporting of the produced liquids component (28) to a central battery using flow lines or pipelines.

In addition, although the primary purpose of the cavern (24) is to permit sand separation, it is also anticipated that some degree or amount of oil and water separation will also occur in the cavern. Thus, the reservoir material (26) will tend to separate within the cavern (24) into a number of layers. More particularly, referring to FIG. 1, three layers will tend to be present in the cavern (24): a lowermost solid component layer (46); an uppermost oil component layer (48); and a middle water component layer (50) positioned between the solid component layer (46) and the oil component layer (48).

Finally, some degree or amount of gas separation may also occur within the cavern (24). As a result, although not shown in FIG. 1, a further gaseous component layer may be present at the top of the cavern (24) and/or an amount of the gaseous component may be present in the production well (42).

Further, it is anticipated that the component layers (46, 48, 50) will not necessarily be distinct or separate, in that some commingling of the solid component (30), the water component (34), the oil component (32) and/or the gaseous component (36) may be found in each component layer (46, 48, 50).

For instance, the liquid components (28) are comprised primarily of liquids or a major portion of the liquid components (28) is liquids. Preferably, the liquid components (28) are comprised substantially of liquids, however, the liquid components (28) may include a relatively small or minor amount of the solid component (30) therein, referred to as a residual solid component, and the gaseous component (36). Similarly, the water component (34) is comprised primarily of water or a major portion of the water component (34) is water. Preferably, the water component (34) is comprised substantially of water, however, the water component (34) may include a relatively small or minor amount of the oil component (32), the solid component (30) and/or the gaseous component (36). The oil component (32) is comprised primarily of oil or a major portion of the oil component (32) is oil. Preferably, the oil component (32) is comprised substantially of oil, however, the oil component (32) may include a relatively small or minor amount of the water component (34), the solid component (30) and/or the gaseous component (36). Finally, the solid component (30) is comprised primarily of solids or a major portion of the solid component (30) is solids.

More preferably, the solid component (30) is comprised substantially of solids, however, the solid component (30) may include a relatively small or minor amount of one or more of the liquid components (28) and/or the gaseous component (36).

As discussed in greater detail below, the reservoir material is preferably introduced into the water component layer (50) by the drainage wells (40) such that the primary separation of the water component (34), the oil component (32) and the solid component (30) takes place within the water component layer (50). Specifically, the oil component (32) tends to rise within the water component layer (50) towards the oil component layer (48) to provide a relatively "clean" oil component layer, while the solid component (30) tends to fall within the water component layer (50) towards the solid component layer (46).

As well, the cavern (24) is further adapted, sized, configured or dimensioned to permit the storage of a desired amount, portion or percentage of the total volume of the solid component (30) or sand anticipated to be produced from the drainage wells (40) over their production life time. Preferably, the cavern (24) is adapted, sized, configured or dimensioned to permit the storage of a major portion, or a majority, of the anticipated total volume of the produced solid component (30). More preferably, the cavern (24) is adapted, sized, configured or dimensioned to permit the storage of substantially all of the anticipated total volume of the solid component (30) to be produced from the drainage wells (40) over their production life time.

However, where the cavern (24) is provided in a soluble formation, such as a salt cavern, the initial cavern volume or dimensions may not have to be capable of storing or containing the total anticipated volume of produced solid component (30), since the continuous flow of produced water component (34) into the cavern (24) over time would tend to dissolve salt from the cavern walls and cause the cavern (24) to grow. Thus, the anticipated growth of the cavern (24) may be utilized to accommodate the total anticipated volume of produced solid component (30).

In an exemplary embodiment, the salt cavern (24) is designed to permanently store all of the solid component (30) or sand produced from the drainage wells (40), requiring a final volume of between about 10,000 $m^3$ and 20,000 $m^3$. This final volume represents a relatively small volume cavern since current salt cavern disposal and storage schemes operate caverns in excess of 300,000 $m^3$. In addition, as indicated, the salt cavern volume may be developed gradually over the life of the drainage wells (40) as produced water component (34) from the oil reservoir (22) will tend to continuously dissolve salt and thus expand the cavern (24) over time.

Thus, to summarize, the cavern (24) is preferably adapted, configured or designed to provide a residence time in the cavern (24) sufficient to allow a major portion of the produced solid component (30) of the reservoir material (26) to separate from the produced liquids component (28). Further, the cavern (24) is preferably adapted, configured or designed to accommodate a major portion of the produced solid component (30), and preferably substantially all of the produced solid component (30), over the anticipated or expected production life of the drainage wells (40). Finally, the cavern (24) is preferably adapted, configured or designed to remain relatively stable for the anticipated or expected production life of the drainage wells (40).

One further factor in the design or configuration of the cavern (24) relates to the location of the entry of the drainage wells (40) in the cavern (24).

As discussed, the drain (38) extends at least between the reservoir (22) and the cavern (24) for draining the reservoir material (26) from the reservoir (22) into the cavern (24). Further, the drain (38) has a drain outlet (52) for connecting the drain (38) with the cavern (24). In some embodiments, the drain (38) is comprised of at least one drainage well (40) and preferably a plurality of drainage wells (40). Each drainage well (40) preferably extends between a surface drain location (54), such as a drainage wellhead, and the cavern (24) and is configured or adapted to pass through the reservoir (22). In this instance, each of the drainage wells (40) includes a drainage well outlet (56), typically located or positioned at, adjacent or in close proximity to a lowermost end of the drainage well (40), and wherein the drain outlet (52) is comprised of a plurality of the drainage well outlets (56). Thus, each drainage well (40) preferably extends from the surface drain location (54) to the drainage well outlet (56). The drainage well outlet (56) is positioned or located within or in close proximity to the cavern (24) such that the reservoir material (26) may pass or flow readily into the cavern (24).

Similarly, the production well (42) preferably extends from a surface production location (58), which is preferably a production wellhead, to a lowermost end of the production well. Further, a production well inlet (60) is located or positioned at, adjacent or in close proximity to the lowermost end of the production well. The production well inlet (60) is also positioned or located within or in close proximity to the cavern (24) such that one or more of the reservoir material components may be produced to the surface at the surface production location (58) through the production well (42).

In order to facilitate sand separation, the drainage wells (40) preferably enter the cavern (24) in the water component layer (50). In other words, the drainage well outlet (56) of each drainage well (40) is located or positioned within or immediately adjacent to or in the close proximity of the water component layer (50). However, preferably, the drainage well outlet (56) of each drainage well (40) is located or positioned substantially within the water component layer (50). Further, the drainage well outlet (56) of each drainage well (40) is preferably located or positioned a spaced distance apart from the production well inlet (60). Further, each drainage well outlet (56) is located below the production well inlet (60), or conversely, the production well inlet (60) is located above the drainage well outlets (56).

Thus, preferably, the drainage well outlet (56) of each drainage well (40) is preferably located or positioned below and spaced apart from the production well inlet (60). The spacing or distance between the drainage well outlets (56) and the production well inlet (60) is selected or determined to inhibit, and preferably minimize, any contamination of the relatively "clean" oil layer in the cavern (24) by the reservoir material (26) entering the water component layer (50) from the drainage wells (40).

However, this configuration tends to result in a net upward flow of the liquid components (28) in the cavern (24) as the liquid components (28) rise from the drainage well outlets (56) to the production well inlet (60) located or positioned nearer the top of the cavern (24). As described further below, the production well inlet (60) is preferably located or positioned in the cavern (24) within or immediately adjacent to or in the proximity of the oil component layer (48), depending upon the desired component to be produced to the surface.

To minimize the amount of the solid component (30) (i.e. sand) that may be carried upwards into the production well inlet (60), the velocity of the fluid components of the reservoir material (26), including the liquid components (28) and the gaseous component (36), rising in the cavern (24) (referred to as the "upward fluid velocity") is preferably less than the velocity of the solid component (30) of the reservoir material (26) settling downwards in the cavern (24) through the fluid component (referred to as the "sand settling velocity"). As discussed below, the upward fluid velocity in the cavern (24) may be estimated based upon fluid production rates for each drainage well (40), wherein the fluid production rates for each drainage well (40) may be based on generalized production curves. To clarify, the "fluid" or "fluid component" includes the liquid components and the gaseous component of the reservoir material.

The sand settling velocity may be estimated by Stokes' law, as follows:

$$V_s = D^2 \frac{g(\rho_s - \rho_f)}{18\mu}$$

Where:
D is the diameter of the sand particles;
$\rho_s$ is the density of the sand;
$\rho_f$ is the density of the fluid;
g is the acceleration due to gravity; and
$\mu$ is the viscosity of the fluid.

Applying the above principles and by way of example, from a review of the geological sequence in Western Canada, it has been found that several salt formations (i.e. Lotsberg Halite, Cold Lake and Prairie Evaporites) underlie the majority of areas in Western Canada having heavy oil reservoirs (22). Most of these salt formations lie between 200 meters and 600 meters below the heavy oil reservoirs (22), but the depth may vary.

The following Table 1 summarizes the depths and thicknesses of the various salt formations, provided by way of example, underlying these heavy oil reservoirs.

TABLE 1

| Formation | Approximate Depth to Top of Salt Formation in Heavy Oil Areas (m) | Approximate Thickness (m) |
| --- | --- | --- |
| Prairie Evaporites | 1000 | 100-150 |
| Cold Lake Salt | 1300 | 40-60 |
| Upper Lotsberg Salt | 1600 | 50-150 |
| Lower Lotsberg Salt | 2000 | 40-60 |

Figure 2:
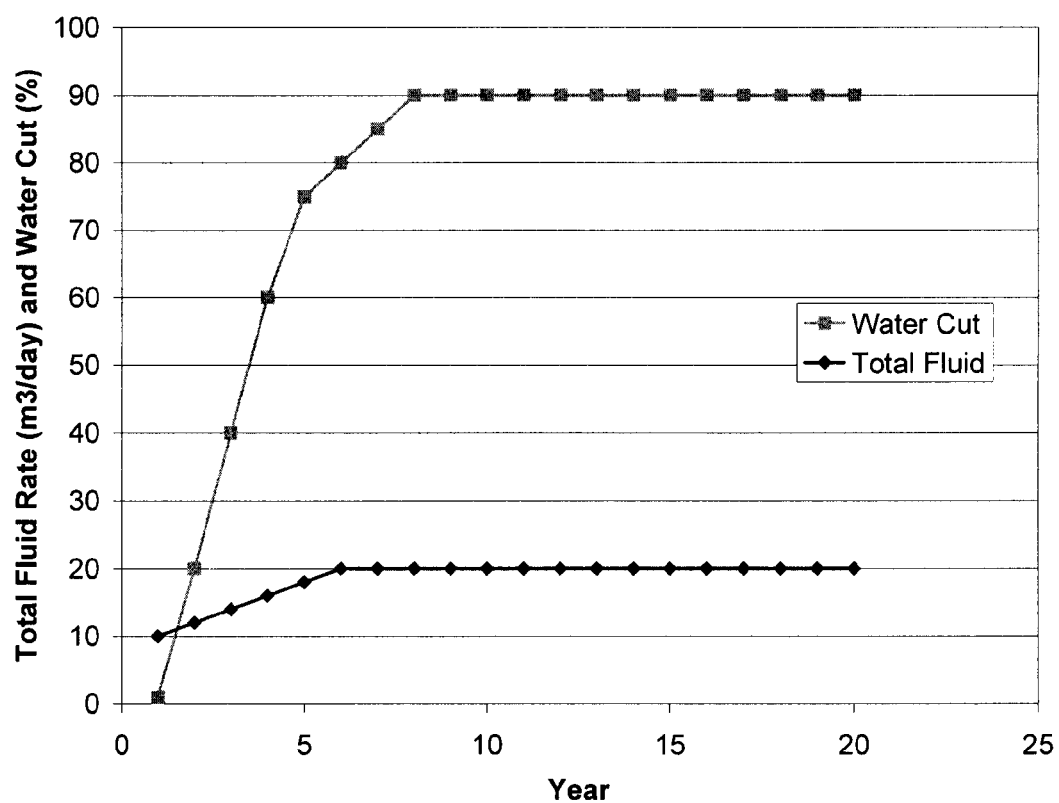
FIG. 2 is a graph showing generalized production curves for the Plover Lake field found in Western Canada.

To estimate the anticipated upward fluid velocity in the cavern (24), fluid production rates for each drainage well (40) were estimated based on generalized production curves provided by Pengrowth Corporation for the Plover Lake field found in Western Canada, as shown in FIG. 2. Given the production profile shown therein, the total fluid produced by a single directional heavy oil well was estimated to be approximately 20 m³/day.

Figure 3:
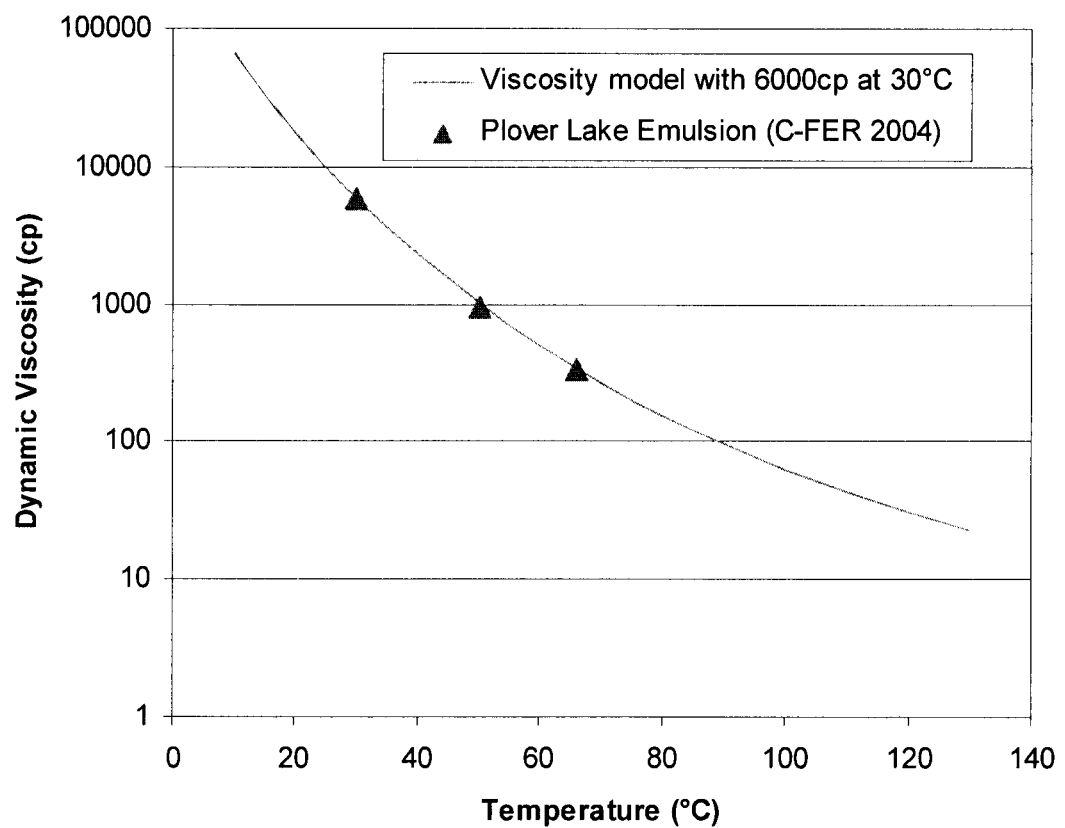
FIG. 3 is a graph showing an estimated viscosity temperature relationship for a produced Plover Lake emulsion.

The viscosity of the produced fluid was also estimated based on measurements of the Plover Lake emulsion, as shown in FIG. 3. It has been found that typical heavy oil reservoir temperatures where CHOPS or "cold heavy oil production with sand" is used tend to be about 25° C. However, because of the greater depth of the salt formations, the cavern temperature is anticipated to be closer to about 40° C. As such, it is expected that the produced fluid will warm as it flows down the drainage wells (40) and will continue to warm while in the cavern (24). Over time, this warming effect may be reduced depending on the rate of fluid production through the cavern (24) as the formation around the cavern (24) is cooled by the produced fluid. Given the complexity of estimating the rate of heat transfer from the surrounding formations to the produced fluid as it flows into and through the cavern (24), as an initial approximation, the cavern operating temperature is anticipated to be about 30° C.

Finally, the average diameter of the particles of the solid component (30), and particularly the particles of produced sand, is estimated to be in a range from about 0.05 mm to about 0.15 mm, which is based on field measurements of the grain size distributions from wellhead fluid samples from Plover Lake.

Figure 4:
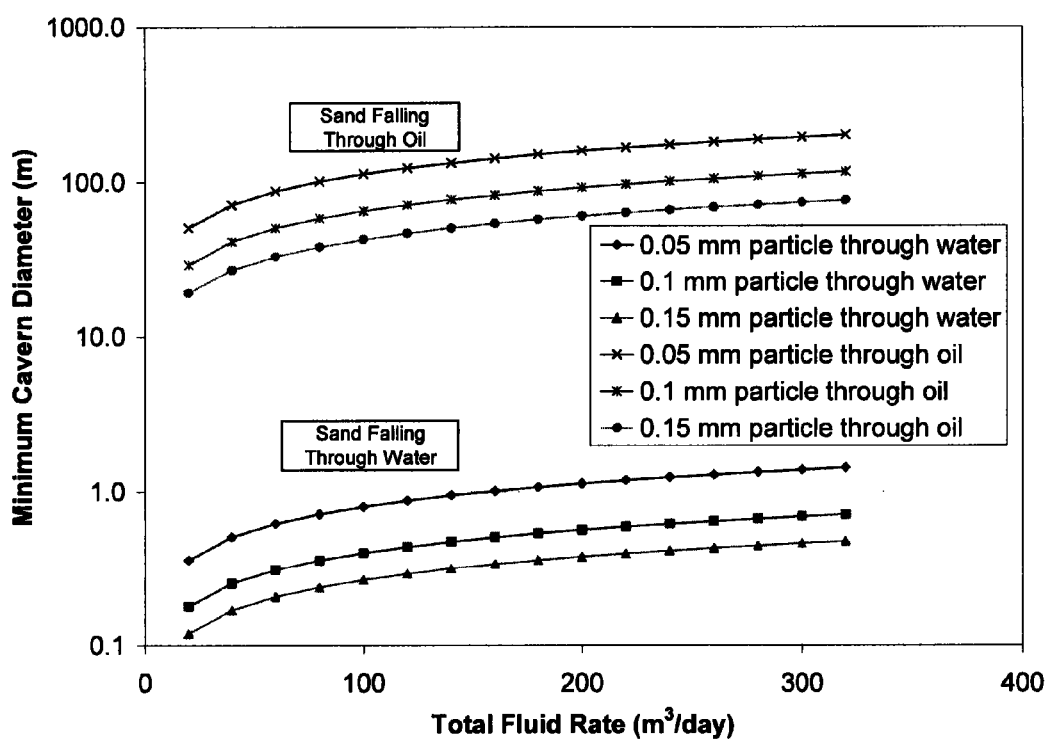
FIG. 4 is a graph showing an estimated minimum cavern diameter based on sand settling velocity.

Based on the above assumptions and using Stokes' Law as described above, the anticipated sand settling velocity of the produced sand particles through the oil emulsion in the cavern (24) is estimated to be on the order of 0.01 m/hour. FIG. 4 shows the estimated minimum cavern diameter required for different total fluid production rates (i.e. different number of drainage wells (40) entering a single cavern) to ensure that the upward velocity of fluid does not exceed the sand settling velocity through oil. The analysis suggests that it may not be practical to construct a cavern (24) where the sand is required to settle through the highly viscous oil component due to the large cavern diameters required. However, according to Stokes' Law, the sand settling velocity through the water component is estimated to be on the order of 8 m/hour. Thus, FIG. 4 shows that the minimum cavern diameter may be reduced substantially based on the anticipated sand settling velocity through the water component.

Accordingly, as illustrated by FIG. 4, based at least in part upon the differing sand settling velocities in the respective oil and water component layers (48, 50), the drainage well outlets (56) are preferably positioned within the water component layer (50), rather than the oil component layer (48). Thus, as indicated, the minimum cavern diameter may be significantly reduced.

In addition to providing for solid component or sand separation, the cavern (24) is also designed or configured to preferably store substantially all of the solid component (30) produced from the drainage wells (40) over their production life time. Based on sand cut measurements on producing CHOPS wells (C-FER 1994), sustained sand cuts typically range from about 1% to 5% by volume. In some cases, wells may produce at a sand cut of approximately 1% throughout the entire production life. In other cases, where the oil is more viscous, initial sand cuts may average approximately 5% for the first few years, then reduce to 1% as the water cut increases later in the well life.

Figure 5:
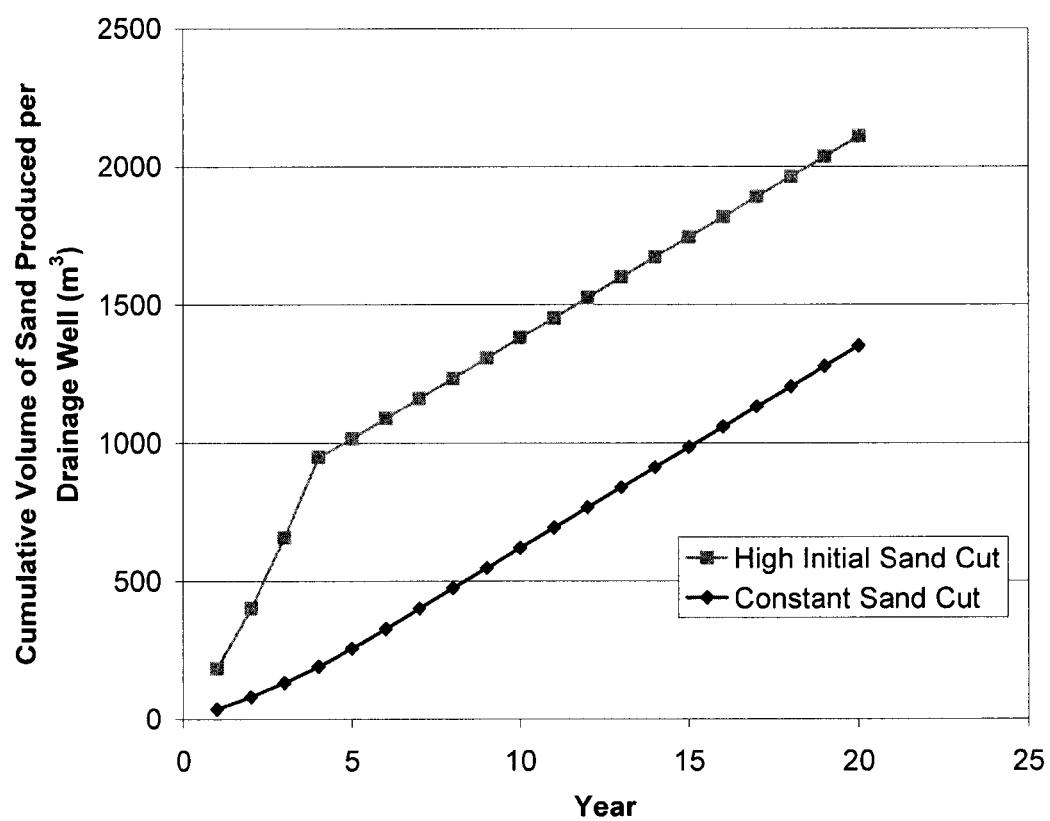
FIG. 5 is a graph showing estimated cumulative produced sand volume for each drainage well.

Based on these two scenarios, and the estimated well production life shown in FIG. 2, the anticipated total volume of the solid component (i.e. sand) produced by a single drainage well (40), assuming a sustained sand cut of about 1% by volume, is estimated as shown in FIG. 5.

Preferably, a plurality of drainage wells (40) are provided. Accordingly, in one example based upon the assumption that as many as nine drainage wells (40) may flow into a single cavern (24), the anticipated total produced volume of the solid component (30) is estimated to be on the order of about 19,000 m³. Assuming that the cavern (24) could still be operated if it was 90% full of the solid component (30), a final cavern volume of about 22,000 m³ would be required. For comparison, salt caverns in the Prairie Evaporites of Western Canada that are used to store natural gas from pipeline transmission networks are on the order of 60 m wide and 85 m tall, with total volumes of about 160,000 m³.

Figure 6:
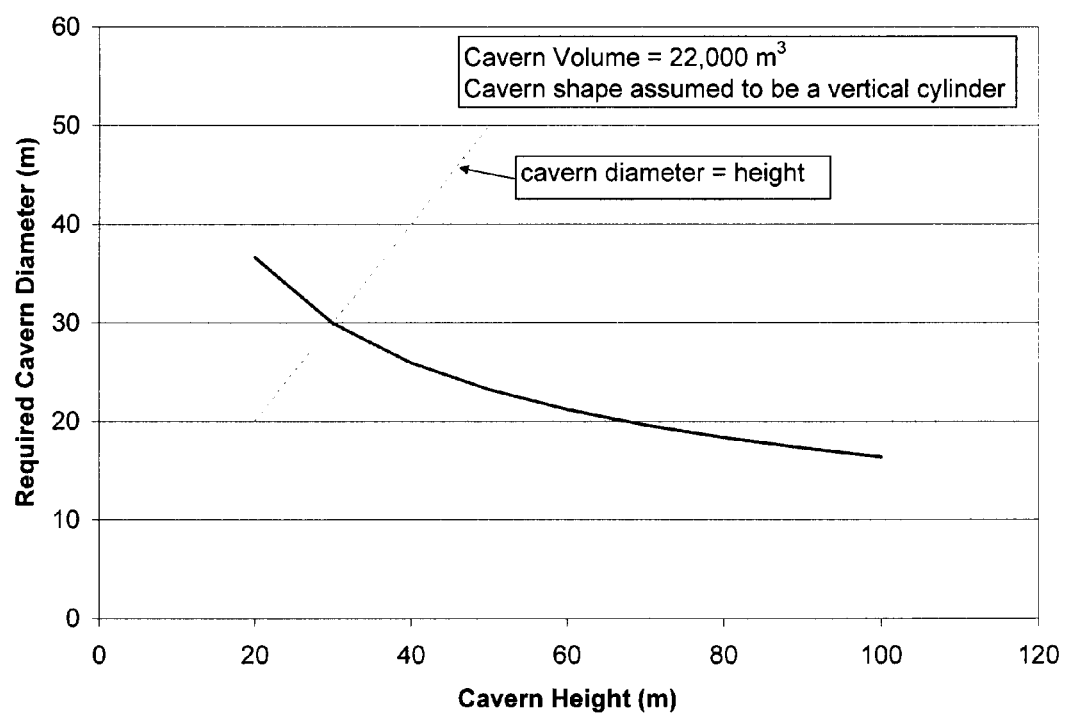
FIG. 6 is a graph showing estimated cavern size to store produced sand from nine drainage wells.

For a 22,000 m³ cavern, FIG. 6 shows the preferred cavern diameter as a function of cavern height. In this regard, it has been found that caverns are generally more stable if they are higher than they are wide. Based on this premise, FIG. 6 shows the anticipated relationship between cavern height and diameter for a 22,000 m³ cavern. Further, FIG. 6 indicates that the minimum cavern height should preferably be at least 30 m.

Further, an amount of salt, or a salt layer, is preferably maintained above the cavern roof to inhibit or minimize leakage of the cavern contents into the overlying formations. Specifically, it has also been found to be preferable to maintain at least about 30 m of salt above the cavern roof to ensure the cavern contents do not leak into the overlying formations. This suggests that a minimum salt thickness on the order of about 60 m may be required for the cavern (24) to store the anticipated solid component (30) over the expected production life of nine drainage wells (40). Thus, in the example and referring to Table 1, this requirement may limit the choice of suitable salt formations in Western Canada to the Lotsberg Salt and Prairie Evaporites, due to their greater thicknesses.

Figure 7:
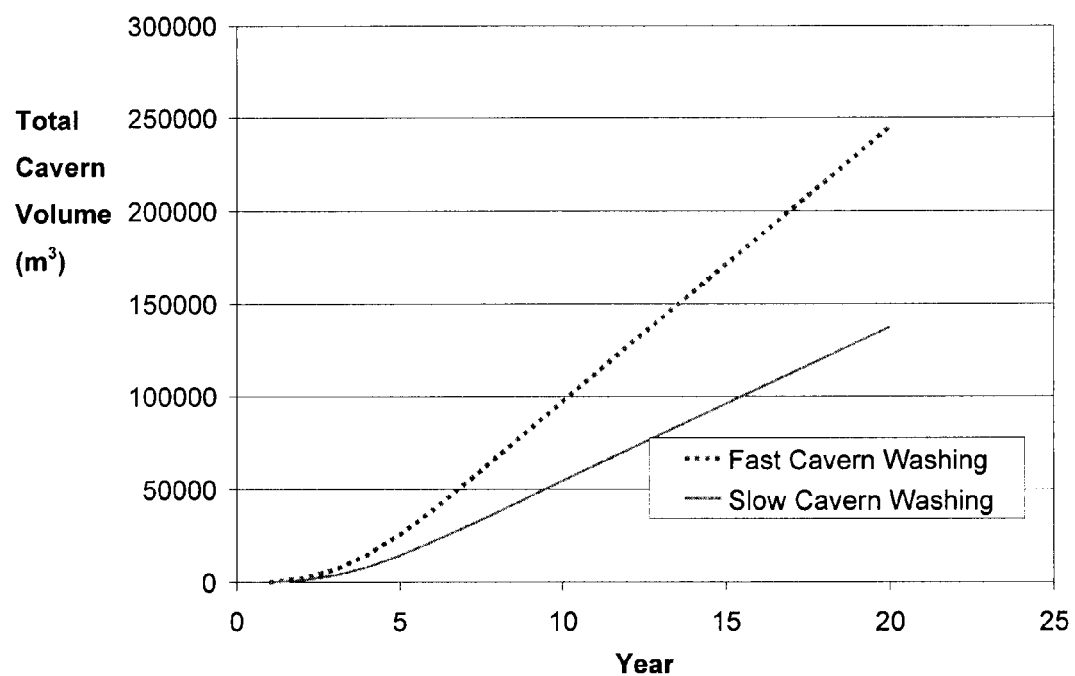
FIG. 7 is a graph showing estimated rate of cavern growth due to dissolution of salt by produced water.

As noted above, the initial cavern volume may not have to be equal to the total or final cavern volume required since the continuous flow of the produced water component (34) of the reservoir material (26) into the cavern (24) will tend to dissolve salt from the cavern walls and cause the cavern (24) to grow over time. It is estimated that the cavern volume will enlarge by about one cubic meter for about every 4 to 7 m³ of water injected when initially washing a cavern. The potential growth rate of the cavern (24) may be bounded based on a fast salt removal rate (e.g. 1 m³ salt per 4 m³ of water produced) and a slow salt removal rate (e.g. 1 m³ salt per 7 m³ of water produced). Accordingly, assuming an initial cavern volume of approximately 100 m³ and given the estimated production history shown in FIG. 2, the cavern (24) may be expected to grow to over 100,000 m³ over the productive life of the drainage wells (40), as shown in FIG. 7.

However, the cavern washing efficiency may decrease as the cavern (24) grows since in-cavern fluid velocities and turbulence may be less and, as such, the produced water component may be less likely to contact the cavern walls in the larger cavern. Nonetheless, the estimated final cavern volume is of a similar size as caverns currently used for other disposal and storage operations in these same formations. As such, it is anticipated that the caverns may grow to be more than five times the volume required for sand settling and storage from drainage wells (40) for the present invention. As a result, any extra or additional cavern space not required for sand settling and storage from the drainage wells (40) of the present invention may be further used for disposing of oilfield wastes from other operations (i.e. once the operation of the present invention is completed).

As indicated, the system (20) comprises at least one drainage well (40), and preferably a plurality of drainage wells (40). Each drainage well (40) may be drilled in any manner such that the drainage well (40) extends through the heavy oil reservoir (22) to the cavern (24). Preferably, the plurality of drainage wells (40) are directionally drilled from one or more surface production locations (58), at a surface pad (62), and are drilled and/or configured to pass through the reservoir (22) and intersect with the cavern (24). More particularly, as indicated, each drainage well (40) preferably extends from the surface drain location (54) or drainage wellhead, through the oil reservoir (22) to the drainage well outlet (56) associated with the cavern (24). The drainage wellhead is preferably located or positioned at the surface, at the surface drain location (54). Further, as shown in FIGS. 1 and 8-11, the drainage wellhead of each drainage well (40) is preferably associated with a respective surface pad (62) at the surface drain location (54). However, in some embodiments, the production wellhead at the surface production location (58) and the drainage wellhead at the surface drain location (54) may coincide, such as on a single surface pad (62). In other embodiments, the production surface location (58) for the production well (42) of one cavern (24) may be utilized as the surface drain location (54) for one or more drainage wells (40) of an adjacent cavern (24), thus utilizing the same surface pad (62).

The drain (38), and preferably each drainage well (40), may be left open hole or uncased or may be completed in any manner, such as with a compatible casing string or tubing string, permitting fluid communication between the drain (38) or drainage well (40) and the subterranean reservoir (22) such that the reservoir material (26) may pass or flow from the reservoir (22) into the drain (38) or drainage well (40) and subsequently from the drain (38) or drainage well (40) into the cavern (24). In some embodiments, each drainage well (40) is cased through its length utilizing compatible heavy oil completion procedures and perforated in the oil reservoir interval. Further, each of the drainage wells (40) has a reservoir interface pressure adjacent to the reservoir (22). Preferably, the reservoir interface pressure is defined at the location of the perforations in the casing string of each drainage well (40).

If desired or required in any particular application of the system (20) or method, a continuous or intermittent fluid injection system, an intermittent gas purge system or other fluid flow enhancement or pumping system (not shown) may be used to facilitate or enhance the flow or feeding of the reservoir material (26) into the cavern (24) via the drainage wells (40). In this case, any compatible enhancement system may be associated with one or more of the drainage wells (40) as required.

However, preferably, gravity drainage is utilized or relied upon in order to feed or flow the reservoir material (26) into the cavern (24) via the drain (38) or drainage wells (40). In other words, preferably, pumping systems or other fluid flow enhancement systems, as discussed, are not utilized or installed within the drainage wells (40). Rather, the reservoir material (26) flows through the drainage wells (40) by gravity drainage to the cavern (24). In other words, the drainage wells (40) simply feed the reservoir material (26) to the cavern (24) by gravity flow.

Each drainage well (40), and preferably the casing string of each drainage well (40), may have any diameter desired or required for the particular operation. However, the use of gravity drainage permits relatively smaller diameter drainage wells (40) and casing strings to be utilized as compared with those required to accommodate a pump or flow enhancement system. For instance, it is believed that in some instances, the casing string may be as small as 89 mm in diameter.

However, the diameter of the drainage well (40) and the casing string are also preferably selected to be large enough to accommodate the running of a downhole logging tool therethrough, if required. In addition, as discussed below, the diameter of the drainage well (40) and the casing string are further preferably selected to be large enough to accommodate the running of a small diameter coiled tubing therethrough in order to clear any obstructions within the drainage well (40), if required.

Further, the lack of use of a pump or flow enhancement system in the drainage well (40) may also place fewer restrictions on the build rates that may be used to construct some of the more complex drainage well geometries (e.g. high-offset pad drilled wells).

The solid component (30), including produced sand and/or other debris, may accumulate within the drainage wells (40), resulting in decreased flow through, or a blockage of, the drainage wells (40). In some cases, a small diameter coiled tubing (not shown) may be run or passed through the drainage well (40) to break up any obstructions in the drainage well (40) and flush them down into the cavern (24). However, in some embodiments, the system (20) further comprises a flushing system (64) permitting the flushing of one or more of the drainage wells (40).

In some embodiments, the flushing system (64) may be associated with the gas collection system (44). In particular, as discussed below, the structure or mechanisms of the gas collection system (44) used to collect or remove the hydrocarbon gas from the drainage and production wells (40, 42) may also be used to inject or flush fluids, such as hot oil, water or gas, down through the drainage and/or production wells (40, 42).

For instance, accumulations of sand or debris in the drainage well (40) may be cleared by the flushing system (64) flushing hot oil or produced water or gas down the drainage well (40) into the cavern (24). In some embodiments, the flushing system (64) may re-circulate a portion of the water component (34) in the cavern (24) to the drainage well (40), preferably at or in proximity to the surface drain location (54) such as the drainage wellhead, and flush the portion of produced water component (34) down the drainage well (40) either intermittently or continuously to provide a sufficient flow rate to dislodge any debris accumulations from the drainage well (40).

The portion of the produced water component (34) to be re-circulated through the drainage wells (40) may be obtained directly from the cavern (24), such as from the water component layer (50). However, preferably, a portion of the water component (34) within the cavern (24) is conveyed through the production well (42) towards the surface. This portion of the produced water component (34) may be re-circulated to the drainage wells (40) from the production well (42), from any location along the length of the production well (42) or from the surface production location (58) such as the production wellhead.

For instance, in one embodiment as shown in FIG. 1, an amount of the water component (34), preferably from the water component layer (50), is conveyed or passed through the production well inlet (60) into the production well (42) and to the surface production location (58). The surface production location (58), and preferably the production wellhead, is adapted or configured for communication or connection with an intervening or connecting communication pipe or flow line (66) which operatively connects the surface production location (58) with a respective drainage well (40) such that a portion of the produced water component (34) from the production well (42) may be communicated or re-circulated to the drainage well (40). More particularly, the intervening or connecting communication pipe or flow line (66) preferably operatively connects, and extends between, the surface production location (58) and a respective surface drain location (54), such as the drainage wellhead, so that the re-circulated water component (34) is communicated or introduced back into the drainage well (40) near, at or in close proximity to the surface. Each intervening or connecting communication pipe or flow line (66) may be comprised of one or a plurality of pipe sections or tubular components.

As indicated, the system (20) is preferably comprised of a production well (42) and a plurality of drainage wells (40). The drainage wells (40) may be drilled or provided in any configuration capable of achieving the function or purpose of the system (20) as described herein.

Heavy oil wells using conventional primary recovery techniques are typically drilled on 4 ha (10 acre) or 16 ha (40 acre) spacing patterns. By way of example, the geological sequence for the Plover Lake field in Western Canada, as discussed above, may be used to illustrate the various well patterns or drainage well (40) configurations that may be used in the system (20) and method of the invention. In these examples, the drainage well (40) spacing in the producing subterranean reservoir (22) is assumed to be 16 ha, or one drainage well (40) per legal sub-division. The reservoir is further assumed to be at a depth of about 800 meters with a net pay thickness of about 10 meters. Finally, the top of the salt cavern (24) is assumed to be about 700 meters below the producing reservoir (22).

Figure 8A:
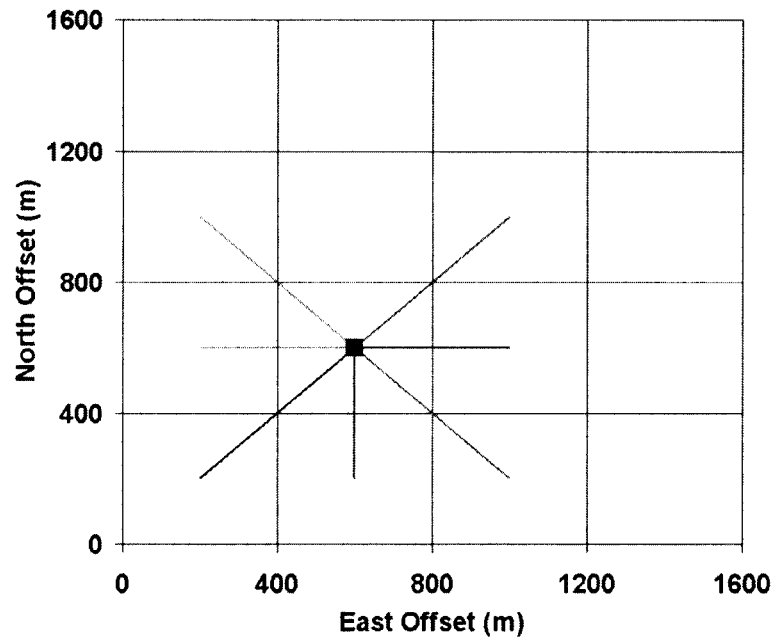
FIGS. 8a and 8b provide a schematic drawing of a top view and a section view respectively of a first well configuration of the drainage wells.
Figure 8B:
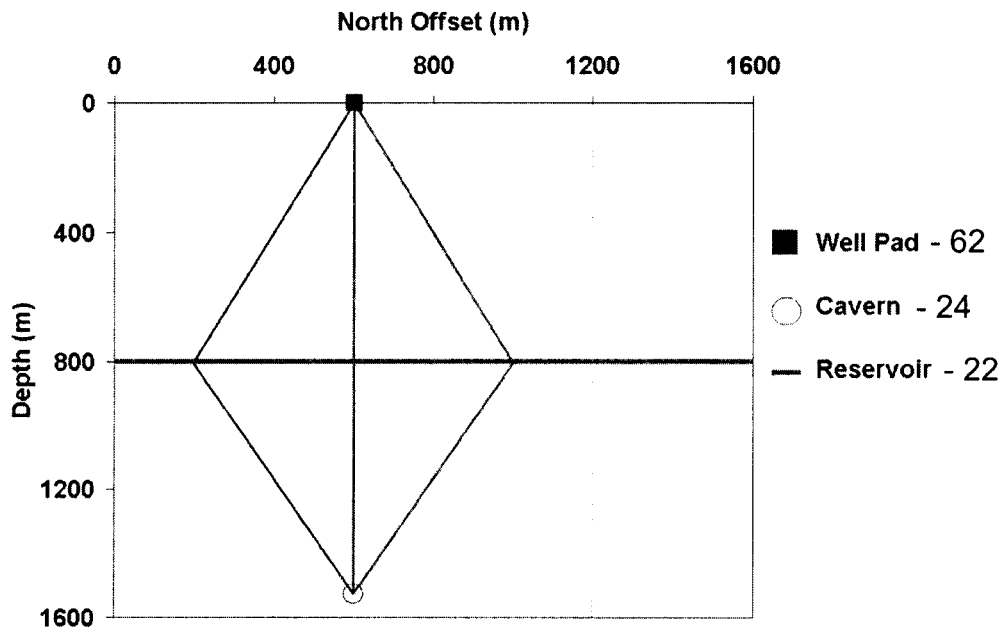
Figure 9A:
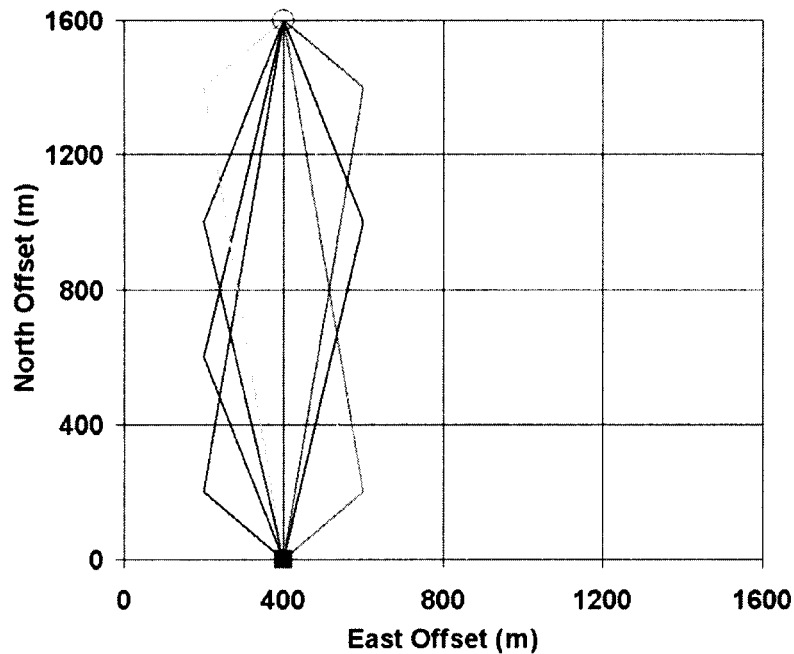
FIGS. 9a and 9b provide a schematic drawing of a top view and a section view respectively of a second well configuration of the drainage wells.
Figure 9B:
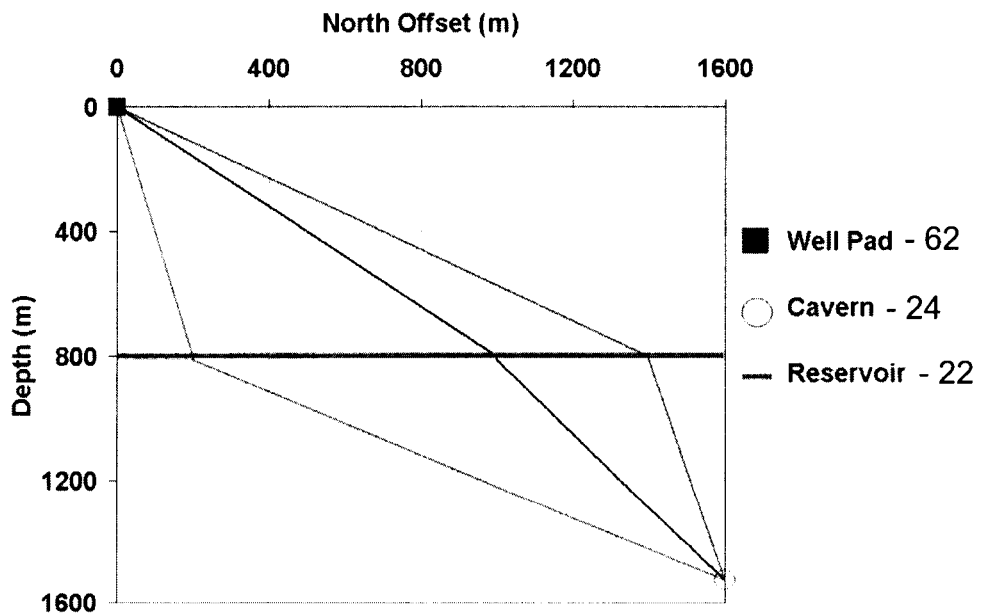
Figure 10A:
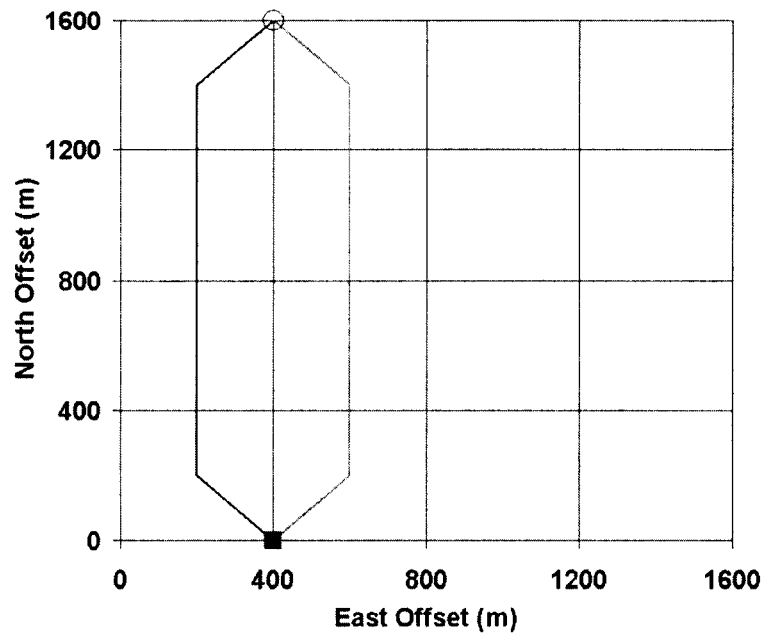
FIGS. 10a and 10b provide a schematic drawing of a top view and a section view respectively of a third well configuration of the drainage wells.
Figure 10B:
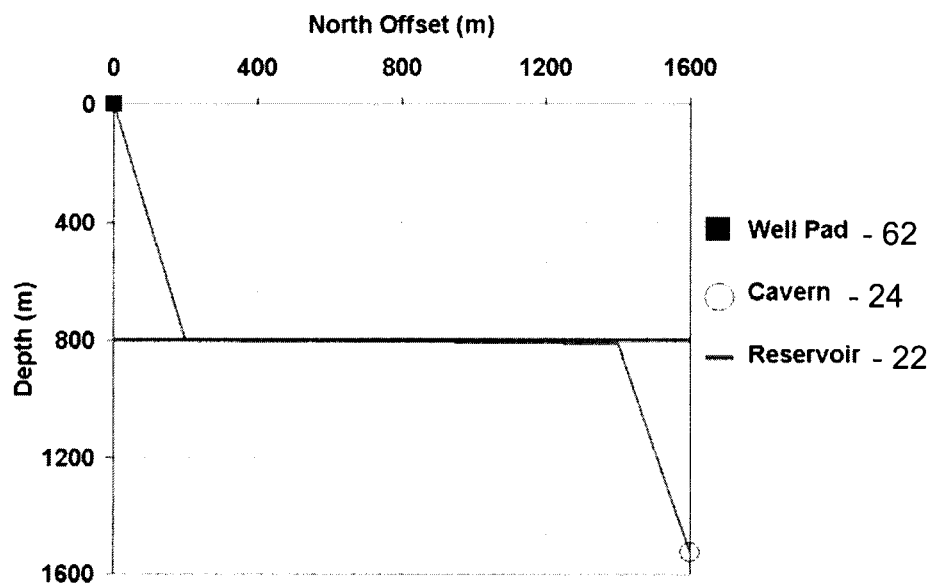
Figure 11A:
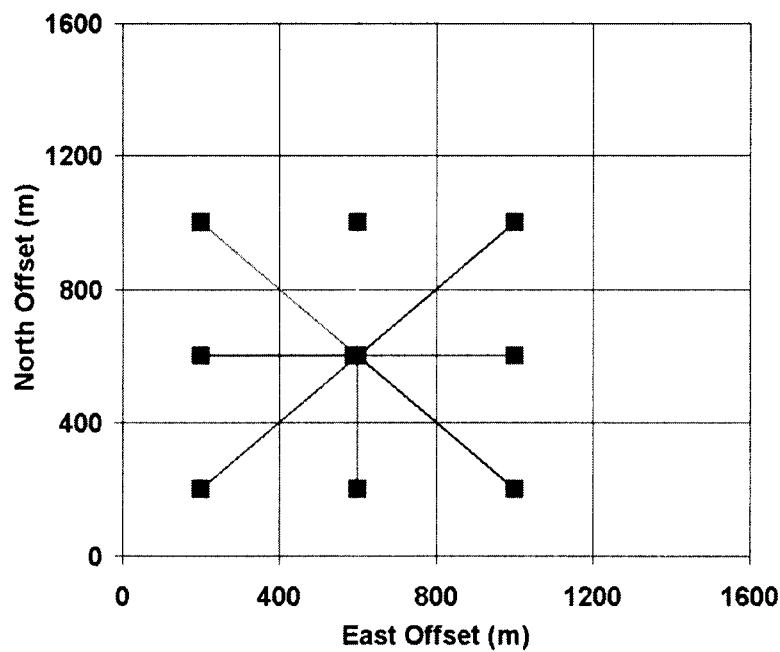
FIGS. 11a and 11b provide a schematic drawing of a top view and a section view respectively of a fourth well configuration of the drainage wells.
Figure 11B:
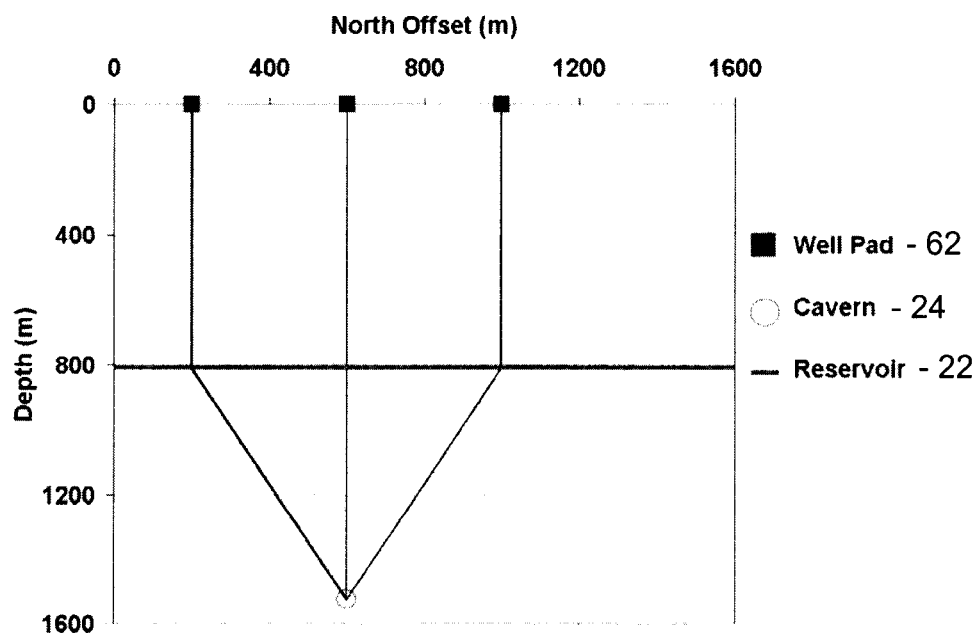

In some embodiments of the well configurations, slant or directional drainage wells (40) may be drilled from the surface production location (58), or from the same surface pad (62) as the production well (42), as shown in FIG. 8, or horizontal wells may be drilled from the surface pad (62) of a production well in an adjoining cavern, as shown in FIG. 9. Horizontal wells may also be drilled from the production well surface pad (62) for one cavern (24) to an adjoining cavern, as shown in FIG. 10. In a simpler configuration, vertical wells may be drilled into the reservoir (22) on standard 4 or 16 ha spacings, then kicked off below the reservoir (22) to intersect with the cavern (24), as shown in FIG. 11. The wellhead locations for these vertical wells would not require any leases, tanks or power systems since the wells would not produce any fluid to surface.

High angle deviated and horizontal drainage wells (40) may not be desirable since flow may be restricted by flow losses and solids settlement in the horizontal or angled sections. However, in these instances, low-rate water injection in the drainage wells (40) may be used to reduce flow losses and increase flow rates in the drainage wells (40) so that the reservoir material (26) may flow freely into the cavern.

In some embodiments, it may be desirable to monitor the production from each drainage well (40) into the cavern (24) in order to track recovery for the appropriate regulatory bodies and in order to determine if remedial work may be required, such as water shut off treatments, or the clearing of sand blockages.

Direct measures of flow through each drainage well (40) may be made using flow meters (such as positive displacement or differential pressure flow meters). However, in some instances, direct measures may be difficult due to the gassy nature of the produced fluid (foamy oil), the low pressure drop available in the drainage well (40) and the presence of sand.

A further method of monitoring each drainage well (40) that may provide sufficient information to infer production is the installation of a distributed temperature and pressure fibre optic cable for some distance below the perforated interval of the drainage well (40). In this instance, the temperature gradient along the drainage well (40) may tend to reflect the rate of flow of cooler fluid from the reservoir (22) into the cavern (24). The pressure gradient may tend to reflect the composition of the flowing fluid, although this measurement may be complicated by gas evolution in the drainage well (40), forming foamy oil. However, gross measures of water cut and flow rate may be possible with this system. In any case, the measurements in all drainage wells (40) may be compared to the overall cavern production to allocate oil and water rates for each drainage well (40).

With respect to the production well (42), although a plurality of production wells may be used, the system (20) and method of the invention preferably comprise and utilize a single production well (42) which is drilled, adapted and/or configured to produce one or more of the liquid components (28) of the reservoir material (26) from the cavern (24) at the surface production location (58), while retaining the solid component (30) in the cavern (24). Preferably, at least a relatively "clean" oil component (32) is produced by the production well (42). However, a relatively "clean" water component (34) may also be produced. In some embodiments, the production well (40) is drilled, adapted and/or configured to produce the oil component (32) and the water component (34) separately at the surface production location (58).

In order to produce the desired liquid components (28), the production well (42) is comprised of or associated with an artificial lift system (68) compatible with and capable of producing the desired liquid components (28). Further, the production well (42) may be drilled in any manner, but is preferably drilled substantially vertically. In addition, the production well (42) is adapted, configured, dimensioned or designed to accommodate the artificial lift system (68), as discussed below. Thus, for instance, the production well (42) is provided with a sufficient diameter to accommodate the artificial lift system (68) to be associated therewith.

As with the drainage wells (40), the production well (42) may be completed in any manner, such as with a compatible casing string or tubing string, permitting fluid to be communicated or transported from the cavern (24) to the surface production location (58) through the production well (42). Preferably, the production well (42) is cased through its length utilizing compatible heavy oil completion procedures.

The production well (42), and any production casing or tubing, may have any diameter desired or required for the particular operation and capable of accommodating the artificial lift system (68) and any other desired or required equipment. For instance, by way of example, progressing cavity artificial lift systems that will fit in 178 mm casing are available that are capable of producing over 300 m³/day with a sufficient lift capacity to pump from a 1500 meter deep cavern. Larger diameter casing strings may be required in more complex production wells (42) with multiple casing strings or downhole separation systems, as described below.

The artificial lift system (68) for the production well (42), which is preferably a relatively high volume lifting or pumping system, may be comprised of one or a plurality of pumps or other artificial lift equipment as required for the particular operation. Further, the artificial lift system (68) provided for the production well (42) may also comprise the flushing system (64) such that the same artificial lift system (68) may be used both to produce the liquid components (28) of the reservoir material (26) to the surface and to re-circulate the water component (34), or a portion thereof, to the drainage wells (40). Alternately, the flushing system (64) may be comprised of a separate or distinct pumping system (not shown).

In any case, each artificial lift system may be comprised of a progressing cavity pumping system, a centrifugal pumping system, any other compatible pumping or artificial lift system or a combination thereof as suitable for the particular operation.

For instance, while progressing cavity pumps are typically used for heavy oil operations, other artificial lift technologies may also be utilized in the system (20) and method of the present invention. Additionally, with the majority of the solid component (30) separated from the liquid components (28) in the cavern (24), and with the oil component (32) at a relatively higher temperature and hence a lower viscosity, an electric submersible pump may also be suitable, especially later in the life of the drainage wells (40) at a time when water breakthrough may increase fluid rates into the cavern (24) above what may be managed using high-volume progressing cavity pumps.

As discussed, the production well (42) is configured to produce one or more liquid components (28) of the reservoir material (26) at the surface production location (58). In some embodiments, the production well (42) is configured to produce both the oil component (32) and the water component (34) together at the surface production location (58). In other words, the production well (42) produces a mixture or combination of the oil and water components (32, 34) from a single production well inlet (60) positioned within the cavern (24). In this embodiment, a progressing cavity pumping system may be preferred in order to minimize any potential remixing of the oil component (32) and the water component (34) as they are pumped to the surface through the production well (42). In this regard, a centrifugal pumping system may tend to emulsify the oil and water components (32, 34), negating some of the separation achieved in the cavern (24).

In some further embodiments, the production well (42) is also configured to produce the oil component (32) at the surface production location (58) and to produce the water component (34) at the surface production location (58). Thus, the production well (42) may be particularly configured to produce the oil and water components (32, 34) separately at the surface production location (58). However, in order to simply the system (20) and to facilitate pipeline transportation on the surface, the production well (42) may preferably be configured to produce the commingled oil and water components (32, 34) together at the surface production location (58).

Although the separate production of the oil and water components (32, 34) may be achieved within any compatible configuration of production well (42) and associated artificial lift system (68), in one embodiment, the artificial lift system (68) is comprised of two pumps installed in or associated with the production well (42). In this instance, the production well inlet (60) is preferably comprised of two separate well intakes, each providing or acting as a pump intake for one of the respective pumps such that a single well intake is associated with each pump for producing the respective liquid component to the surface.

More particularly, one of the production well intakes is preferably associated with a first pump and is positioned above the oil-water interface in the cavern (24), or within the oil component layer (48), so that pumping of the first pump intakes the oil component (32) and produces the oil component (32) at the surface production location (58). The other of the production well intakes is preferably associated with a second pump and is positioned below the oil-water interface in the cavern (24), or within the water component layer (50), so that pumping of the second pump intakes the water component (34) and produces the water component (34) at the surface production location (58). Thus, the oil component (32) and the water component (34) may be selectively and separately pumped to surface. In this instance, production rates from the two pumps may be varied to manage the oil-water interface level in the cavern (24) to optimize the oil-water-sand separation efficiency. Further, when desired, the water component (34) may be separately produced through the production well (42) for re-circulation by the flushing system (64) to the drainage wells (40), for transferring to a subterranean disposal zone or for transferring or re-circulating back to the reservoir (22) as a waterflood, as discussed further below.

In either case, the single production well inlet (60) or the uppermost production well intake is preferably positioned a short distance (e.g. about 5 to 10 meters) below the cavern roof. This positioning permits the oil component layer (48) to accumulate at the top of the cavern (24), thus minimizing the upward growth of the top of the cavern (24) and maintaining a stable cavern roof. Alternately, the production well inlet (60) may be installed well above the cavern (24), while a tail pipe or other conduit or extension extends downwardly from the production well inlet (60) into the cavern (24) for communication therewith. This arrangement may minimize equipment such as rod strings for surface drive pumps or power cables for sub-surface electric drives.

An instrument string may be utilized, where desired, to provide valuable information for operating the production well (42). For instance, the instrument string may provide distributed pressure and temperature readings in the production well (42) and upper part of the cavern (24).

In the single pump configuration of the artificial lift system (68) described above, it is anticipated that, under constant operating conditions, the oil-water interface would tend to be located at or in proximity to the production well inlet (60) such that the production well (42) may produce the oil and water components (32, 34) together, or as an oil-water emulsion from the "rag layer" at the oil-water interface.

However, in the single pump configuration of the artificial lift system (68), production of the oil and water components (32, 34) together may be avoided by monitoring the oil-water interface based on the temperature and pressure data and managing the pumping or production rate so that these emulsions are not produced but remain in the cavern (24) long enough to separate. In order to achieve this result, the production well (42) and the artificial lift system (68) may need to be operated intermittently so that a significant volume of the oil component (32) may accumulate in the cavern (24) and separate from the water component (34) before it is pumped out. Where required or desired, chemical treatments such as emulsion breakers may also be added to either the production well (42) or drainage wells (40) to enhance separation of the reservoir material (26) into the reservoir material components in the cavern (24).

Further, as indicated above, the liquids components (28) of the reservoir material (26), including both the water component (34) and the oil component (32), are likely to contain a small amount of fines, solid material or sand. This small amount of fines, solid material or sand comprises a residual solid component. In other words, the major portion, and preferably substantially all, of the solid component (30) of the reservoir material (26) is permitted to separate from the liquid components (28) in the cavern (24). However, the liquid components (28) typically include a minor amount or relatively small amount of sand or solids which is not readily separated therefrom. Thus, the separated liquid components (28) may contain a residual solid component.

As a result, in some embodiments of the method and system (20), a solids removal system (70) is associated with the production well (42) for removing a portion, and preferably a major portion or substantially all, of the residual solid component from the liquid components (28) before they are produced at the surface production location (58). Thus, depending upon the particular configuration of the production well (42), the solids removal system (70) may remove the residual solid component from the water and oil components (34, 32) as they pass together through, or are acted upon by, the solids removal system (70). Alternately, the solids removal system (70) may remove the residual solid component from the water component (34) and the oil component (32) as each of the components (34, 32) passes separately through, or is acted upon by, the solids removal system (70).

The solids removal system (70) may be comprised of any mechanism or device compatible or suitable for use downhole with or within the production well (42) and capable of removing the residual solid component. However, in some embodiments, the solids removal system (70) is comprised of a de-sanding system or device such as a hydrocyclone installed at, near or in close proximity to the production well inlet (60) in order to remove the residual solid component as the liquid components (28) pass from the cavern (24) into the production well (42). Alternately, the solids removal system (70) may be positioned at any compatible location along the length of the production well (42) between the surface production location (58) and the production well inlet (60).

Following removal, the residual solid component may be disposed of in any suitable manner. For instance, the residual solid component may be re-introduced or returned to the cavern (24) within a lower portion of the water component layer (50) such that the residual solid component may settle within the cavern (24) to the solid component layer (46) at the bottom of the cavern (24). The re-introduction or return of the residual solid component to the water component layer (50) of the cavern (24) may permit or facilitate the removal of further oil bound with, or not previously separated from, the solid component (30) (i.e. by washing), thereby improving or enhancing recovery of oil from the sand.

As stated, the water component (34) is preferably separated from the oil component (32) in the cavern (24). The separated water component (34) may be removed from the cavern (24) and produced to the surface production location (58) via the production well (42) separately from or concurrently with the oil component (32). In addition, as described above, the produced water component (34) may be re-circulated to the drainage wells (42), preferably via the surface drain location (54).

The produced water component (34) may also be transferred or injected into a suitable disposal horizon or subterranean disposal zone above or below the cavern (24) via a downhole water disposal system. The downhole water disposal system may transfer the water component (34), or a portion thereof, directly from the cavern (24) to the disposal zone. Alternatively, the downhole water disposal system may transfer the water component (34), or a portion thereof, indirectly from the cavern (24) to the disposal zone through or via the production well (42) or other equipment or components of the system (20). Finally, the produced water component (34) may also be transferred, injected or re-circulated back to the reservoir (22) as a waterflood or to otherwise enhance reservoir production. In this instance, the water component (34), or a portion thereof, may be transferred directly from the cavern (24) to the reservoir (22). Alternately, the water component (34), or a portion thereof, may be transferred indirectly from the cavern (24) to the reservoir (22) through or via the production well (42) or other equipment or components of the system (20).

Water which is not separated from the oil component (32) in the cavern (24) may be produced from the cavern (24) along with the oil component (32). Alternatively, a supplementary downhole oil/water separation system (not shown) may be provided to separate the water from the oil component (32), following which the separated water may be handled in any of the manners noted above, such that the separated water may be produced to the surface production location (58) via the production well (42), transferred to a suitable disposal zone above or below the cavern (24) and/or re-circulated to the drainage wells (40) and/or the reservoir (22).

More particularly, it may be feasible to install a downhole oil-water separation (DHOWS) system in the production well (42) when high water-oil ratios are produced. With this approach, a single DHOWS system may separate and transfer or inject the water produced by all the drainage wells (40)

draining into the cavern (24). As stated, the separated water may be transferred or injected into the disposal zone, which may be situated between the cavern (24) and the producing reservoir (22). In a further configuration, the water may be transferred or re-injected into the producing reservoir (22) as a waterflood from the production well (42) without ever bringing the water to the surface.

While the liquid components (28) and solid component (30) of the reservoir material (26) will tend to flow down into the cavern (24), the gaseous component (36), including gas evolving from the produced fluid such as hydrocarbon gas, will tend to rise through the drainage wells (40) towards the surface. In addition, a portion of the gaseous component (36), such as hydrocarbon gas, may flow to the cavern (24) with the liquid components (28). In this instance, the hydrocarbon gas may largely separate from the liquid components (28) and solid component (30) as they flow down to the cavern (24) or the hydrocarbon gas may separate after entering the cavern (24). In either case, the hydrocarbon gas tends to rise from the cavern (24) through the drainage and production wells (40, 42).

As a result, the method and system (20) of the present invention may further comprise the gas collection or gas gathering system (44), as noted previously, for collecting the gaseous component (36), and particularly hydrocarbon gas, contained within either, and preferably both, of the drainage and production wells (40, 42). The gas collection system (44) would be utilized to collect the hydrocarbon gas to minimize any venting from the system (20). Further, the hydrocarbon gas may be collected at the surface production and surface drain locations (58, 54) and used for heating, power generation or for other uses such as re-injection for enhanced oil recovery. Thus, the interconnected wellhead system (20) as described herein may serve as a gathering system for produced gas, reducing energy needs for further treatment of the produced oil component (32) and reducing the greenhouse gas emissions from the operation.

The gas collection system (44) may be comprised of any mechanism, device or structure capable of and suitable for gathering the hydrocarbon gas as it rises within at least one of, and preferably both of, the drainage wells (40) and the production well (42). For instance, in one embodiment as shown in FIG. 1, the gas collection system (44) may be comprised of the same structure or mechanism as the flushing system (64).

In particular, the hydrocarbon gas is conveyed or permitted to pass or rise within the production well (42) to the surface production location (58). Similarly, the hydrocarbon gas is conveyed or permitted to pass or rise within the drainage wells (40) to the surface drain location (54). As discussed previously, the surface production location (58), and preferably the production wellhead, is adapted or configured for communication or connection with the intervening or connecting communication pipe or flow line (66) which operatively connects the production wellhead with a respective drainage well (40). Thus, when the communication pipe (66) is not being utilized by the flushing system (64) for re-circulation of the water component (34), the hydrocarbon gas may be permitted to pass from the drainage well (40), through the communication pipe (66) to the production well (42) at the surface production location (58). The gas may then be removed and collected at the surface production location (58).

As indicated, a single mechanism or structure may be provided to comprise the flushing system (64) and the gas collection system (44). In this case, only one operation (flushing or gas collection) may be performed at a time. Alternately, separate and distinct mechanisms or structures may be provided for each of the flushing system (64) and the gas collection system (44).

Further, it is preferable to be able to control or regulate the operating pressure in the cavern (24), and thus the effective drawdown at the perforated interval in the drainage wells (40). This may be done by controlling the pressure at the drainage and production wellheads (40, 42). Accordingly, the method and system (20) of the present invention may be further comprised of a pressure regulating system (72) for regulating the pressure in the drainage wells (40) and the production well (40).

The pressure regulating system (72) may be comprised of any mechanism, device or structure capable of and suitable for regulating the pressure in at least one of, and preferably both of, the drainage and production wells (40, 42). Thus, the pressure regulating system (72) may be associated with or comprised of the gas collection system (44).

For instance, the reservoir interface pressure of the drainage wells (40), preferably at the location of the perforations in the drainage wells (40), may be managed by controlling the fluid level in the production well (40) and the pressure in the gas collection system (44). In this way, the liquid level in the drainage wells (40) may be maintained to maximize the drawdown at the sand face. This may include maintaining the fluid level below the perforations in the drainage wells (40), however, this may affect the inflow from the reservoir (22). Thus, in some embodiments, the pressure regulating system (72) may manage the reservoir interface pressure in the drainage wells (40) in order to facilitate draining of the reservoir material (26) into the cavern (24).

Further, the operating pressure in the cavern (24) may be controlled and the pressure in the drainage and production wells (40, 42) may be regulated utilizing the interconnected well structure or system (20), including the gas collection system (44). Specifically, the gas pressure may be regulated at a single location, such as the production wellhead at the surface production location (58). Alternately, the gas pressure at each drainage well (40) and the production well (42) may be controlled separately. This alternate method allows the drainage wells (40) to be selectively operated at a sand face pressure at essentially "pumped off" pressure conditions which may substantially increase production rates over current operations.

Thus, for example, the pressure in the drainage and production wells (40, 42) may be regulated by simply controlling or monitoring the amount of the gaseous component (36) collected or removed from the drainage and production wells (40, 42) by the gas collection system (44).

Further, a relatively long residence time in the cavern (24) and natural heating of the reservoir material (26) in the cavern (24) due to the greater depth of the cavern (24) than the producing reservoir (22) may be sufficient to produce relatively "clean" oil and relatively "clean" water from the cavern (24). In alternate embodiments, chemical treatments such as, but not limited to, demulsifiers and flocculants may be used to enhance separation in the cavern (24).

However, the heavy oil produced via the invention is expected in most cases to be relatively free of solids and may also be warmed to an extent where it may be practical to flowline or pipeline the oil to a central facility instead of using trucks to transport the heavy oil to the central facility.

In addition, experience has shown that the use of horizontal wells for heavy oil production has typically only doubled the volume of oil produced despite the fact that the length of the producing interval has increased many times. Many horizontal wells have also been prone to premature watering out. This poor performance has been attributed to various factors including: geological variations, drilling practices, sand plugging, and non-uniform drawdown. One key difference between conventional wells (vertical, directional and slant) and horizontal wells is that horizontal wells are typically completed with some form of sand control system since it is assumed that well productivity would be severely impaired if the well fills with sand. This well completion approach seems to contravene the general belief that sand must be produced to get economic flow rates in primary heavy oil operations. By employing the invention with short horizontal wells and no sand control devices, some or all of these problems may be largely overcome and the productivity of horizontal wells may be increased several fold.

As well, current heavy oil operations producing large volumes of sand frequently report casing deformations in the producing interval due to formation compaction and the associated overburden subsidence. These deformations often prevent downhole artificial lift systems from being installed in the optimum position (i.e., seated below the perforated interval to help remove the produced sand from the well). In the practice of the invention, downhole access to the drainage wells (40) will not usually be required, with the result that well deformations will not likely impact well operations as they may in conventional heavy oil wells.

Infill drilling operations in depleted reservoirs may also be more economical with the practice of the invention. Small diameter drainage wells may be drilled into existing caverns to access untouched areas of the reservoir (22). No additional production equipment is required and the infill well may be drilled directionally from existing surface facilities.

With the practice of the invention, the life of heavy oil wells that experience water influx may also be extended. This result may be achieved as a result of lower water handling costs due to minimal pumping and treating requirements and on site disposal of water in the preferred case, or the production of water to surface facilitating pipeline transport to another disposal site as an alternative case.

As discussed above, different well configurations may be conceived within the scope of the invention that would allow the drainage of a very large area with minimal surface lease area requirements. The tangible benefits of reduced surface facilities, lease requirements and road construction include reduced environmental impact and larger areas of agricultural land left untouched.

The present invention may also permit the incorporation of existing wells into a new cavern collection system as either the drainage wells (40) or the production well (42) by deepening the existing wells using coiled tubing or some other suitable re-entry drilling technique. This approach would take full advantage of the existing infrastructure of roads and wells and could substantially increase the economic life of mature heavy oil fields.

The invention may also be useful in heavy oil regions where the produced sand contains naturally occurring radioactive material (NORM), causing surface handling to be a serious environmental issue. The invention may also hold potential for offshore applications (e.g., North Sea) where sand production poses a major hurdle in the development of large heavy oil deposits.

Further, the present invention may reduce the environmental footprint in several ways, such as reducing the surface disturbance due to smaller and fewer leases and road access requirements, eliminating or reducing lease tank burner flue gas emissions and tank venting emissions because lease tanks are not required, reducing vehicle emissions because flow lines may be used instead of trucking, reducing the risk of environmental damage from spills or run off from vehicles and surface facilities handling produced sand, and improving worker safety by reducing manpower requirements for well monitoring, trucking, servicing and emissions and contact with produced fluids and sand.

The present invention may also be utilized in other applications such as bitumen recovery from carbonates, oil shale deposits and coalbed methane by minimizing surface impact with simple drainage well surface locations. In addition, centralizing water production in coalbed methane operations may reduce the need for multiple artificial lift systems.

Finally, the present invention may provide significant economic benefits as compared with current primary heavy oil operations for several reasons. Large amounts of the solid component (30) or sand are not typically produced to the surface. In fact, preferably, a minimal amount of sand is produced to surface (i.e. small amounts of fine solids may be suspended in the oil and produced). Thus, sand handling and disposal costs are significantly reduced.

As a result of reducing the amount of sand produced to the surface, flowlines or pipelines may be used to transport the produced water and oil components (34, 32), which reduces the required trucking, which may reduce operating and road maintenance costs and greenhouse gas emissions and may extend well life.

A single high-volume artificial lift system (68) may be used to produce the liquid components (28) to surface from the cavern (24), reducing the potential need for separate artificial lift systems in each well. This may reduce the capital cost associated with installing artificial lift or pumping equipment and reduce the need for lease tanks and prime mover systems at each surface lease.

Pumping or artificially lifting the oil component (32) with a reduced amount of sand from the cavern (24) may reduce the wear in the downhole artificial lift system (68), and therefore may extend the equipment run-life and reduce down time and well servicing. Also, the higher fluid temperature may reduce the oil viscosity and decrease flow losses in the artificial lift system (68), reducing lifting costs.

The frequency of work-overs to clean sand accumulations from wells may be reduced. Also, the complexity of cleanouts may be reduced from multi-day bailing operations in conventional CHOPS wells to simple pressure truck flushes, such as where hot fluid is pumped down the drainage well (40) and into the cavern (24). Further, this work-over process may be facilitated by the flushing system (64) described above.

Centralizing water production into the cavern (24) may also make it more economical to incorporate automatic, downhole water disposal systems that may reduce water handling and disposal costs on surface, thus extending well life beyond where current water handling costs make well operation uneconomic.

Gas evolving from the oil in the cavern (24) may be captured more efficiently than gas being released from individual wellheads and lease tanks making it more economical to utilize the gas for heating or power generation, thus potentially further reducing greenhouse gas emissions.

By way of example only, in order to understand the economic impact of implementing the invention on reservoirs where CHOPS is presently implemented, a high level economic analysis was performed based on the vertical well configuration shown in FIG. 11 and the production profile shown in FIG. 2.

Well drilling costs were estimated based on information provided by Pengrowth Corporation for both conventional heavy oil wells and the well system (20) of the present invention as shown in the following Table 2. For this analysis, all wells were assumed to be completed with 178 mm diameter production casing. The greater cost of the drainage wells (40) compared to the production well (42) (which may also be referred to as the "pumping well") reflects the more complex well geometry of the drainage wells (40). The total well construction, completion and lease costs for a 9-well operation using the well system (20) of the present invention (which is referred to as the "SuperSump") is shown in the following Table 3, compared to the estimated cost for a 9-well conventional heavy oil operation (which is referred to as "CHOPS"). The total cost for drilling the SuperSump wells was estimated to be almost 25% more than a conventional CHOPS well development.

TABLE 2

|  | 1500 m Vertical Pumping Well | 1500 m Directional Drainage Well | 800 m Vertical CHOPS Well |
|---|---|---|---|
| Location | $ 25,000 | $ 25,000 | $ 25,000 |
| Drilling - General | $106,500 | $195,000 | $106,500 |
| Drilling - Daywork | $103,000 | $120,000 | $ 56,650 |
| Formation Evaluation | $ 7,000 | $ 7,000 | $ 7,000 |
| Casing and Attachments - General | $ 41,500 | $ 33,000 | $ 41,500 |
| Casing and Attachments - PC cementing | $ 20,000 | $ 20,000 | $ 11,000 |
| Casing and Attachments - Production casing | $ 72,000 | $ 42,000 | $ 39,600 |
| General Expenses | $ 23,900 | $ 26,500 | $ 23,900 |
| Wellhead and Tie-In | $ 50,000 | $ 50,000 | $ 50,000 |
| Production Tubing | $ 64,000 | $— | $ 35,200 |
| Pump, Rods and Drive | $ 80,000 | $— | $ 44,000 |
| Total | $592,900 | $518,500 | $440,350 |

TABLE 3

|  | Number | Unit cost | Total |
|---|---|---|---|
| CHOPS |  |  |  |
| Pumping Wells | 9 | $440,350 | $3,963,150 |
| Drainage Wells | 0 | $518,500 | $— |
| Leases | 9 | $ 30,000 | $ 270,000 |
|  |  | Total | $4,233,150 |
| SuperSump |  |  |  |
| Pumping Wells | 1 | $592,900 | $ 592,900 |
| Drainage Wells | 9 | $518,500 | $4,666,500 |
| Leases | 1 | $ 30,000 | $ 30,000 |
|  |  | Total | $5,289,400 |

In addition, the cost for washing the cavern (24) and laying flow lines to the cavern (24) and gas collection lines to the drainage wells (40) was estimated as shown in the following Table 4.

TABLE 4

|  | Units | Unit Cost | Total |
|---|---|---|---|
| Washing operation (m$^3$) | 7000 | $ 10 | $ 70,000 |
| Water handling/disposal (m$^3$) | 7000 | $ 1 | $ 7,000 |
| Install/remove wash string (days) | 4 | $3,000 | $ 12,000 |
| Flow lines (m) | 5000 | $ 100 | $500,000 |
|  |  | Total | $589,000 |

Pengrowth Corporation also provided CHOPS operating costs for the Plover Lake operation as shown in the following Table 5. This breakdown in costs was used to estimate the operating costs for a SuperSump operation by applying reduction factors as shown in Table 5.

Well servicing was assumed to be reduced substantially in the SuperSump operation by essentially eliminating sand related work-overs such as sand cleanouts and equipment repairs. Surface repairs were assumed to be reduced as well because fewer artificial lift systems would be used and most of the lease surface facilities would be eliminated. Chemicals and taxes were assumed to be unchanged in the SuperSump operation. Energy was assumed to be reduced slightly due to the efficiency of running one pump instead of nine, even though the net lift requirement will be somewhat higher in the SuperSump operation depending on the cavern pressure. Labour was assumed to be reduced due to having fewer artificial lift units to monitor and no tanks to gauge. Trucking was assumed to be essentially eliminated by installing flow lines. Lease fuel was assumed to be reduced by eliminating tanks, and thus, tank heaters.

TABLE 5

| Cost | CHOPS Unit Operating Cost ($/m$^3$) | Estimated Reduction with SuperSump | Supersump Unit Operating Cost ($/m$^3$) |
|---|---|---|---|
| Well Servicing | $21.67 | 80% | $ 4.33 |
| Surface Repairs | $10.40 | 80% | $ 2.08 |
| Chemicals | $ 2.71 | 0% | $ 2.71 |
| Energy | $ 6.74 | 25% | $ 5.06 |
| Taxes | $ 2.90 | 0% | $ 2.90 |
| Labour | $ 6.74 | 50% | $ 3.37 |
| Trucking | $ 1.20 | 90% | $ 0.12 |
| Lease Fuel | $21.99 | 50% | $10.99 |
|  | $74.34 |  | $31.56 |

Sand handling and disposal costs were estimated based on an assumed sand production rate of 1% sand cut in conventional CHOPS operations and a unit handling and disposal cost of $100/m$^3$ of produced sand. Sand handling costs were assumed to be zero in the SuperSump system (20) since it is assumed that no significant sand is produced to surface.

Figure 12:
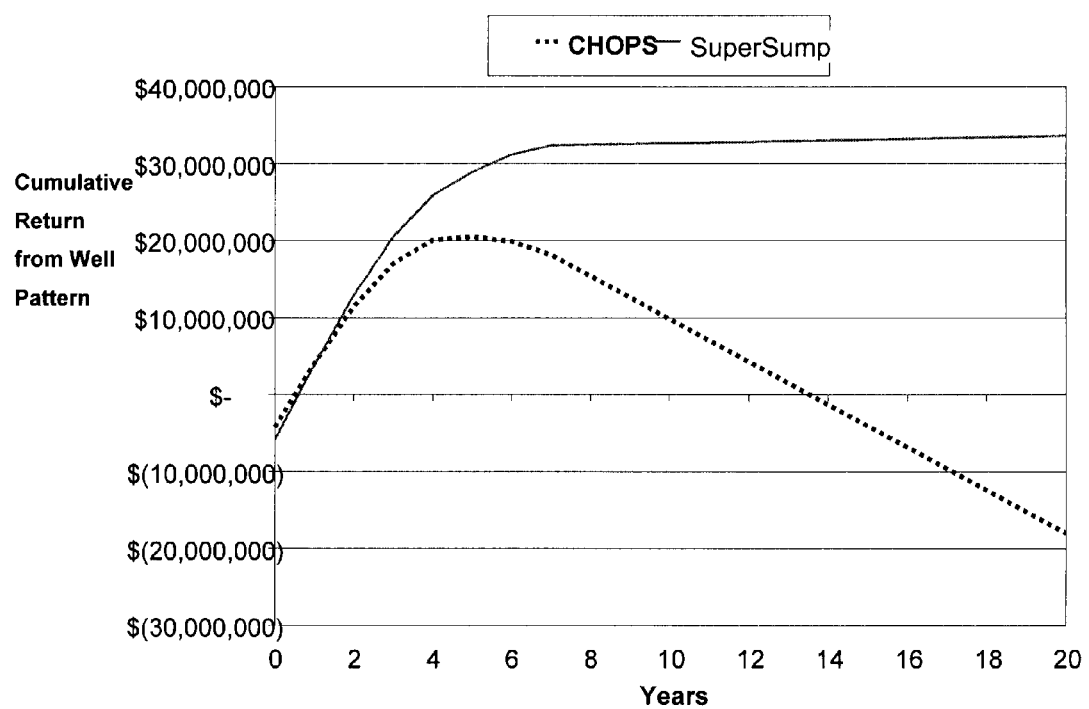
FIG. 12 is a graph showing an estimated cumulative economic return for a nine drainage well system compared to a conventional CHOPS operation.

These capital and operating costs were compared to the oil revenue based on an oil price of $330/m$^3$ (CDN $52/bbl) The resulting net return cash flow for the conventional 9-well CHOPS operation and the 9-well SuperSump system (20) operation are shown in FIG. 12. Note that the higher drilling costs for the SuperSump system (20) operation of the present invention appear to be recovered within approximately one year due to the lower operating costs.

This analysis does not account for the expected reduction in surface treating requirements of the oil due to the expected improvement in oil cleanliness produced from the well system (20) operation of the present invention. Also, the analysis did not consider that it may be possible to operate the drainage wells (40) at lower bottomhole pressures than in conventional wells where substantial fluid levels must be maintained to protect downhole pumps from running dry. This may lead to higher fluid rates and faster payback than predicted in the high-level model.

In many cases, water breakthrough makes conventional operations uneconomical. However, the anticipated lower operating costs of the operation of the present system (20) may significantly increase the economic life of an operation well past water breakthrough. For example, FIG. 12 shows that the economic return remains positive for the SuperSump system (20) even with the water cut at 90% (i.e. production past year seven). The analysis shows that conventional operations tend to become uneconomical (i.e. downward trend in the cumulative return curve) if the water cut exceeds about 80% which is consistent with the economics of many CHOPS operations. Therefore, the operation of the system (20) of the present invention appears to have the potential to extend the economic life of an operation, potentially leading to increased ultimate recovery.

Finally, in this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. A system for use in association with a subterranean reservoir containing reservoir material, for separating the reservoir material into a plurality of reservoir material components and for producing one or more of the reservoir material components at a surface production location, the system comprising:
   (a) a subterranean cavern located entirely below the reservoir a spaced distance below the reservoir;
   (b) a drain comprising at least one drainage well extending between the reservoir and the cavern for draining the reservoir material from the reservoir into the cavern so that the reservoir material may be collected in the cavern and separated into the reservoir material components in the cavern; and
   (c) a production well extending between the cavern and the surface production location for producing one or more of the reservoir material components at the surface production location, wherein the production well is separate and distinct from the at least one drainage well, wherein the reservoir material components are comprised of one or more liquid components and a solid component, and wherein the production well is configured to produce one or more of the liquid components at the surface production location while retaining the solid component in the cavern.

2. The system as claimed in claim 1 wherein the drain is comprised of a plurality of drainage wells, wherein each of the drainage wells extends between the reservoir and the cavern, and wherein the production well is separate and distinct from each of the drainage wells.

3. The system as claimed in claim 1 wherein the cavern is comprised of a salt cavern.

4. The system as claimed in claim 1 wherein the liquid components are comprised of an oil component and wherein the production well is configured to produce the oil component at the surface production location.

5. The system as claimed in claim 4 wherein the liquid components are further comprised of a water component and wherein the production well is further configured to produce the water component at the surface production location.

6. The system as claimed in claim 5 wherein the production well is configured to produce separately the oil component and the water component at the surface production location.

7. The system as claimed in claim 1, further comprising a solids removal system associated with the production well for removing a residual solid component from the liquid components before they are produced at the surface production location.

8. The system as claimed in claim 1 wherein the drain has a drain outlet for connecting the drain with the cavern, wherein the production well has a production well inlet for connecting the production well with the cavern, and wherein the production well inlet is located above the drain outlet.

9. The system as claimed in claim 1 wherein the drain has a drain outlet for connecting the drain with the cavern, wherein the drain is comprised of a plurality of drainage wells, wherein each of the drainage wells extends between the reservoir and the cavern, wherein the production well is separate and distinct from each of the drainage wells, and wherein the drain outlet is comprised of a plurality of drainage well outlets.

10. The system as claimed in 9 wherein each of the drainage wells extends between a surface drain location and the cavern, further comprising a gas collection system for collecting hydrocarbon gas contained within the drainage wells and the production well.

11. The system as claimed in claim 10, further comprising a pressure regulating system associated with the gas collection system for regulating the pressure in the drainage wells and the production well.

12. The system as claimed in claim 9, further comprising a flushing system for flushing the drainage wells.

13. A method for use in association with a subterranean reservoir containing reservoir material, the method comprising:
   (a) providing a subterranean cavern located entirely below the reservoir a spaced distance below the reservoir;
   (b) providing a drain comprising at least one drainage well extending between the reservoir and the cavern;
   (c) providing a production well extending between the cavern and a surface production location, wherein the production well is separate and distinct from the at least one drainage well;
   (d) draining the reservoir material through the drain from the reservoir into the cavern so that the reservoir material may be collected in the cavern;
   (e) separating the reservoir material iii the cavern into a plurality of reservoir material components; and
   (f) producing one or more of the reservoir material components at the surface production location through the production well, wherein the reservoir material components are comprised of one or more liquid components and a solid component, and wherein producing one or more of the reservoir material components is comprised of producing one or more of the liquid components at the surface production location while retaining the solid component in the cavern.

14. The method as claimed in claim 13 wherein providing the drain is comprised of providing a plurality of drainage wells, wherein each of the drainage wells extends between a surface drain location and the cavern, and wherein the production well is separate and distinct from each of the drainage wells.

15. The method as claimed in claim 14 wherein the drainage wells and the production well contain hydrocarbon gas, further comprising collecting the hydrocarbon gas using a gas collection system.

16. The method as claimed in claim 14 wherein each of the drainage wells has a reservoir interface pressure adjacent to the reservoir, further comprising managing the reservoir interface pressure in the drainage wells in order to facilitate draining of the reservoir material into the cavern.

17. The method as claimed in claim 14, further comprising flushing the drainage wells.

18. The method as claimed in claim 17 wherein the liquid components are comprised of a water component, wherein the water component is produced at the surface production location, and wherein flushing the drainage wells is comprised of passing the produced water component through the drainage wells.

19. The method as claimed in claim 14, further comprising monitoring the drainage wells during draining of the reservoir material.

20. The method as claimed in claim 19, wherein monitoring the drainage wells is comprised of measuring a flow of the reservoir material from each of the drainage wells into the cavern.

21. The method as claimed in claim 19, wherein monitoring the drainage wells is comprised of measuring a temperature gradient and a pressure gradient along each of the drainage wells.

22. The method as claimed in claim 13 wherein the cavern is comprised of a salt cavern and wherein providing the cavern is comprised of forming the cavern by solution mining.

23. The method as claimed in claim 13 wherein the liquid components are comprised of an oil component and wherein producing one or more of the liquid components is comprised of producing the oil component at the surface production location.

24. The method as claimed in claim 23 wherein the liquid components are further comprised of a water component and wherein producing one or more of the liquid components is further comprised of producing the water component at the surface production location.

25. The method as claimed in claim 24 wherein producing one or more of the liquid components is comprised of producing the oil component and the water component separately.

26. The method as claimed in claim 24 wherein the cavern contains a solid component layer, a water component layer and an oil component layer and wherein the reservoir material is drained into the cavern so that the reservoir material enters the cavern within the water component layer.

27. The method as claimed in claim 13, further comprising removing a residual solid component from the liquid components before they are produced at the surface production location.

28. The method as claimed in claim 13, wherein the liquid components are comprised of a water component, further comprising transferring the water component from the cavern to a subterranean disposal zone.

29. The method as claimed in claim 13, wherein the liquid components are comprised of a water component, further comprising transferring the water component from the cavern to the reservoir.

\* \* \* \* \*

UNITED STATES PATENT AND TRADEMARK OFFICE
CERTIFICATE OF CORRECTION

PATENT NO.         : 9,010,419 B2
APPLICATION NO.    : 12/441058
DATED              : April 21, 2015
INVENTOR(S)        : Brian T. Wagg et al.

Page 1 of 1

It is certified that error appears in the above-identified patent and that said Letters Patent is hereby corrected as shown below:

IN THE CLAIMS
Column 30, Line 37, (Claim 13, line 15) change "iii" to --in--.

Signed and Sealed this
Thirteenth Day of October, 2015

Michelle K. Lee
*Director of the United States Patent and Trademark Office*